United States Patent [19]
Gist et al.

[11] 4,375,582
[45] Mar. 1, 1983

[54] TELEPHONE ANSWERING SYSTEM AND METHOD

[76] Inventors: Larry B. Gist, 1865 E. Broadway - #423; Carroll D. Carruth, Jr., 4605 S. Priest - #416, both of Tempe, Ariz. 85282

[21] Appl. No.: 231,579

[22] Filed: Feb. 4, 1981

[51] Int. Cl.³ .............................................. H04M 3/50
[52] U.S. Cl. ............................................... 179/27 FH
[58] Field of Search ....... 179/90 AN, 27 FH, 27 FG, 179/27 FF, 175.2 C, 27 FC, 18 B, 7.1 R, 7 MM, 7 R, 8 A, 6.2, 6.18

[56] References Cited
U.S. PATENT DOCUMENTS
3,987,252 10/1976 Vicari ............................. 179/27 FH Primary Examiner—Thomas W. Brown
Attorney, Agent, or Firm—Cahill, Sutton & Thomas

[57] ABSTRACT

A telephone answering system includes a processor, a memory for storing alphanumeric subscriber information for each subscriber and typed-in alphanumeric messages for each subscriber, a keyboard for manual entry of the typed-in subscriber messages and commands for operating the answering system, and a CRT display for displaying which trunk lines are ringing, which are on hold, alphanumeric subscriber information for the telephone trunk line presently being answered, alphanumeric subscriber messages retrieved from the memory or being typed into the answering system by means of the keyboard, and indicators showing whether or not the retrieved subscriber message has been accepted by the subscriber. In one embodiment of the invention, a subscriber has a subsystem coupled to a trunk line. The subsystem includes a CRT and a keyboard. The subscriber can directly communicate with the processor to obtain a display of previously called-in messages on the subsystem CRT.

25 Claims, 36 Drawing Figures

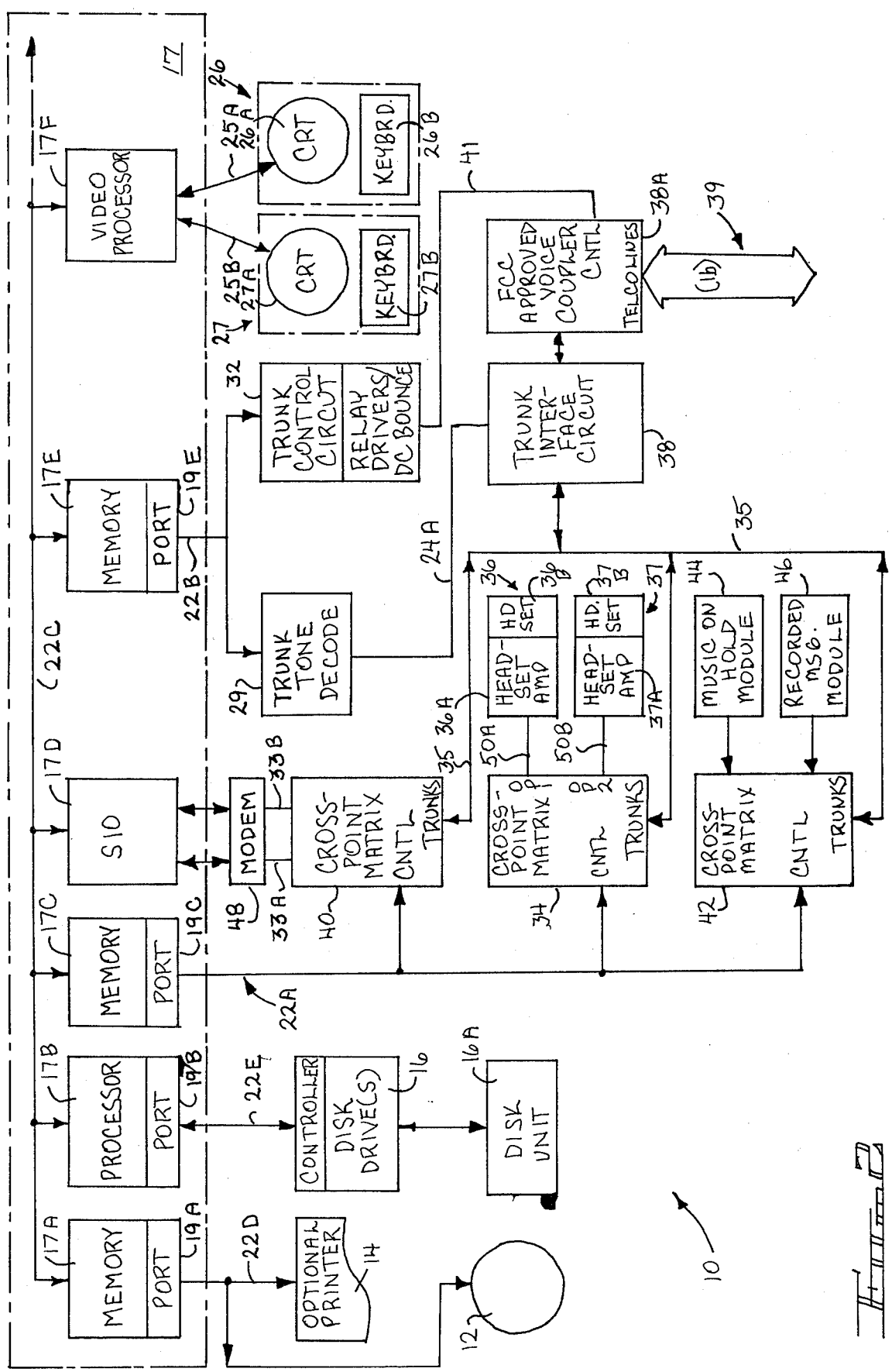

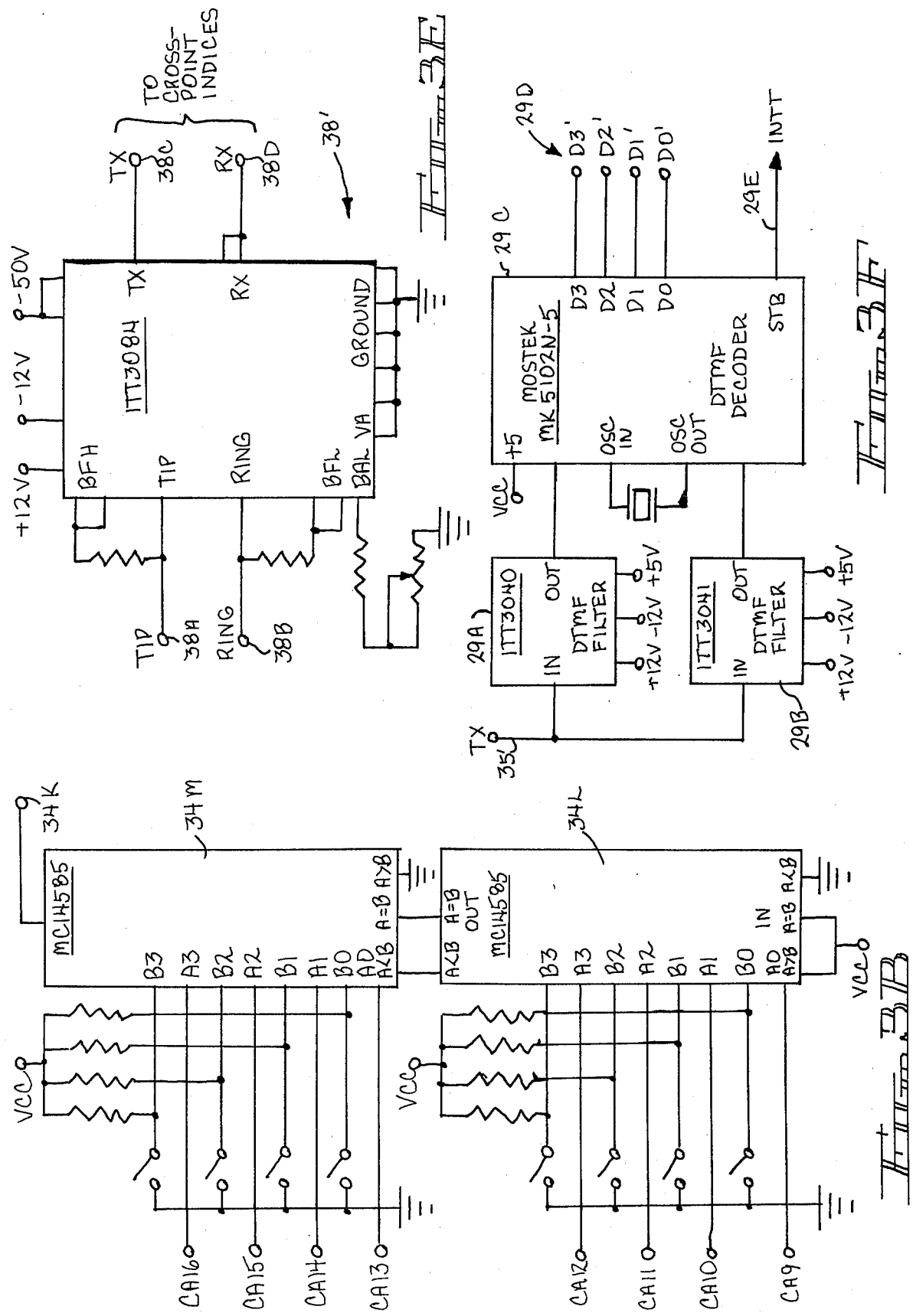

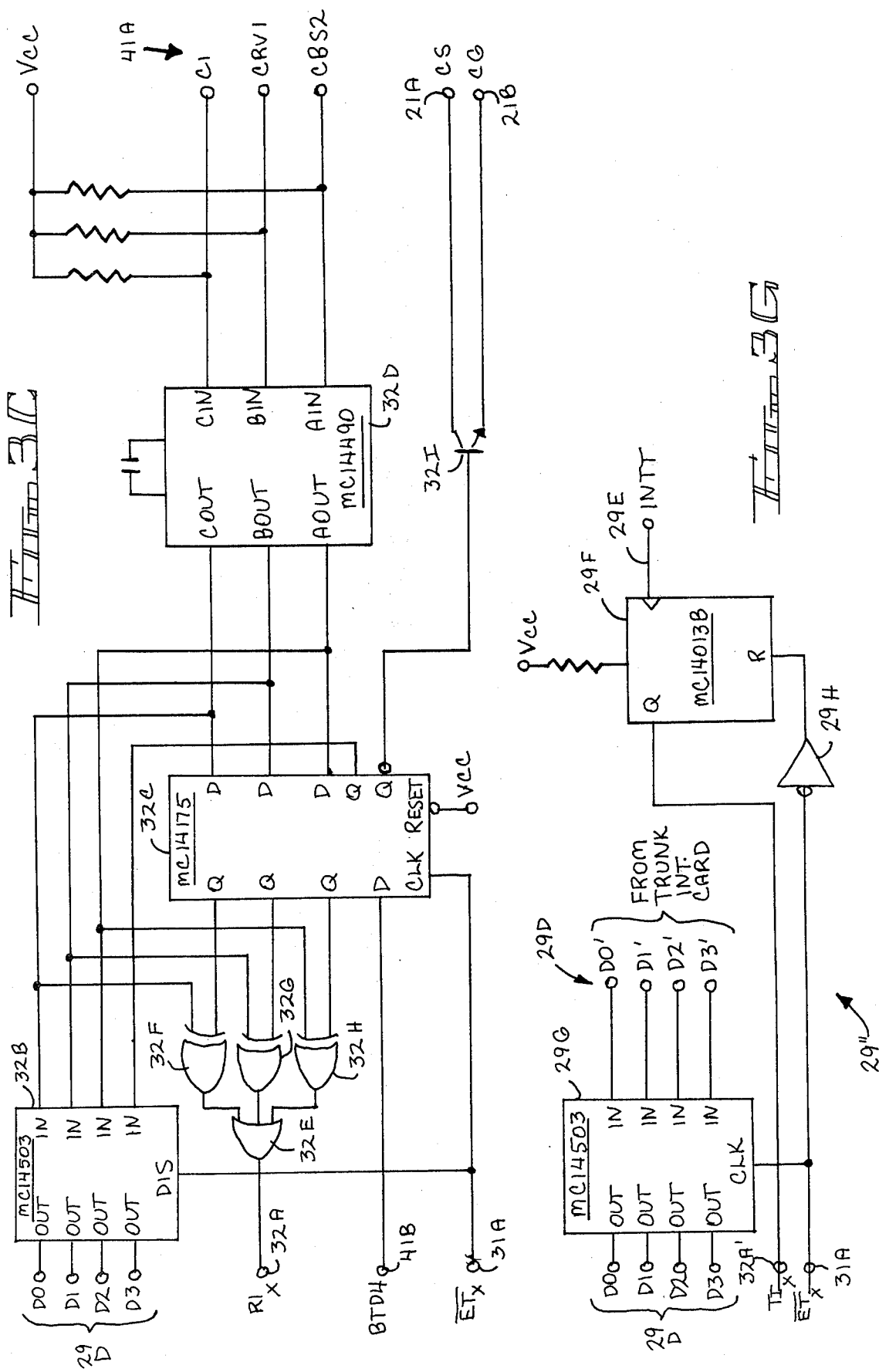

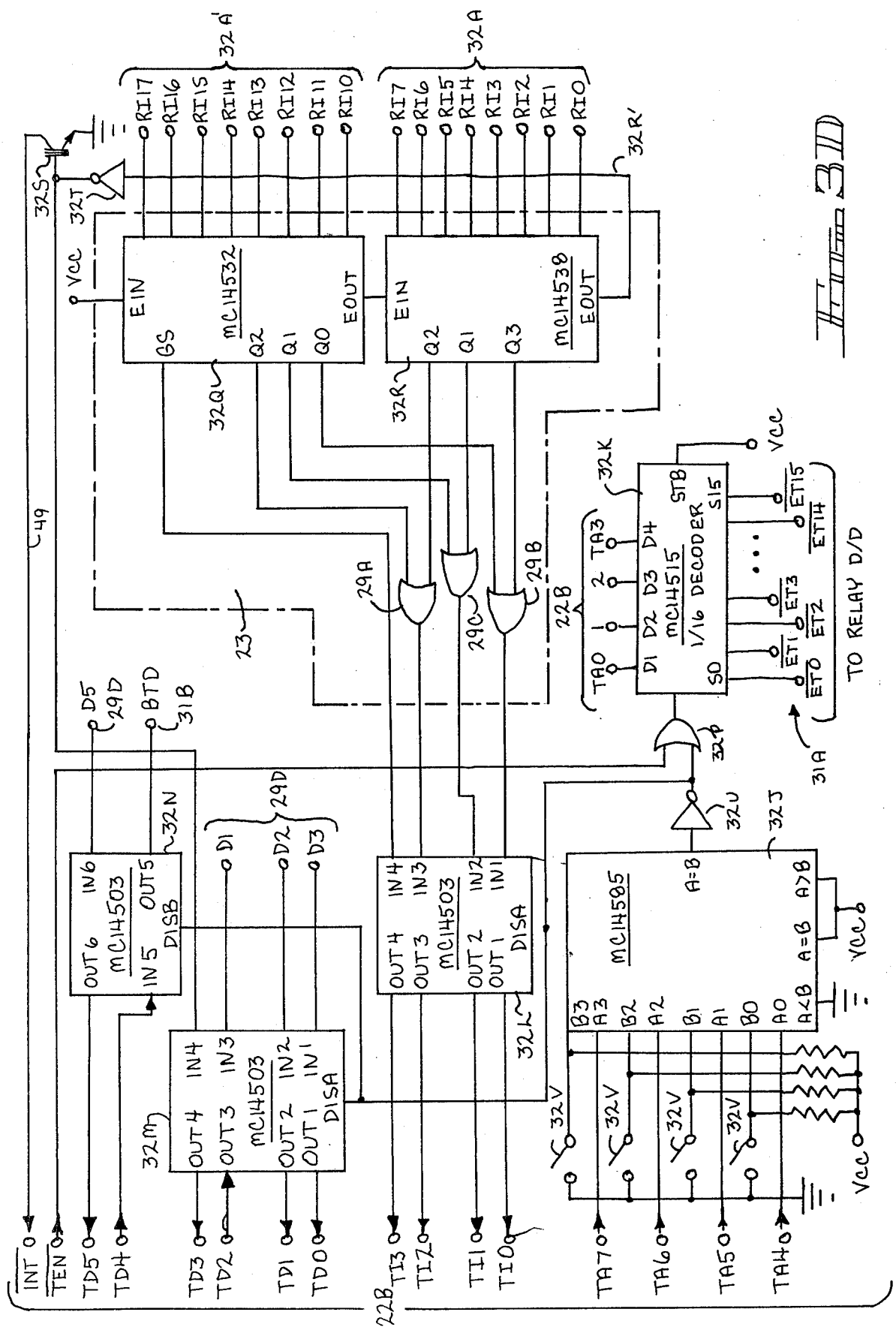

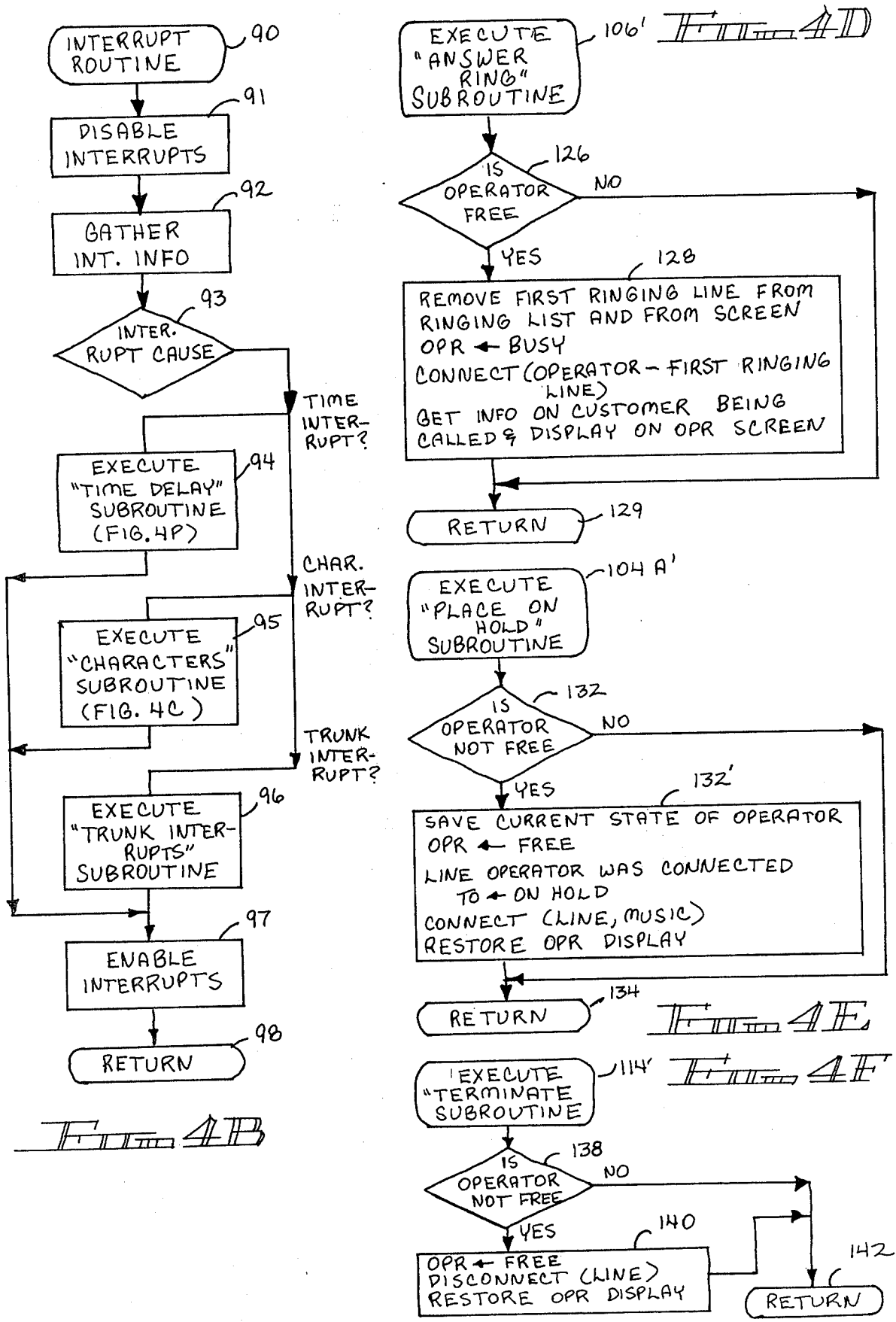

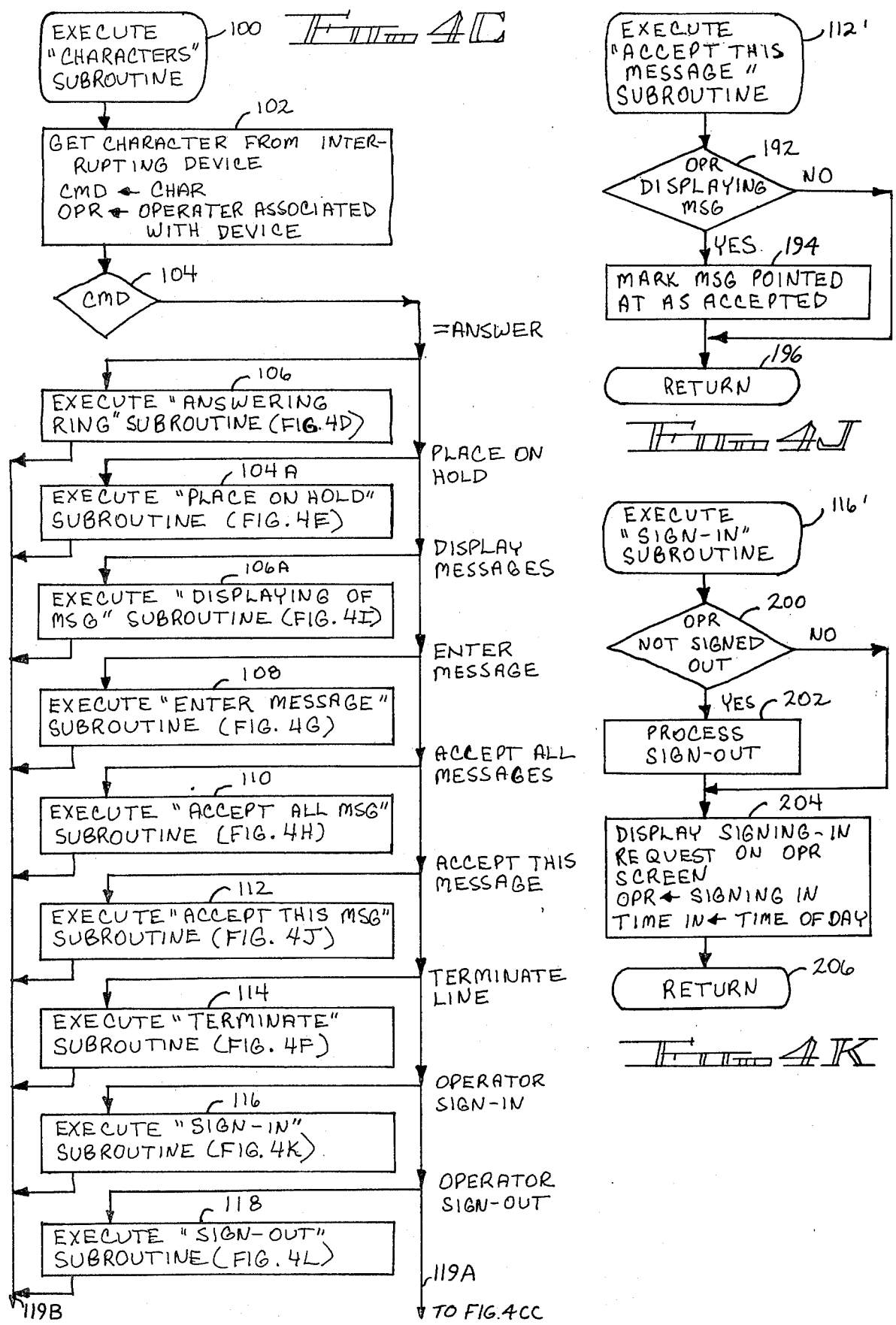

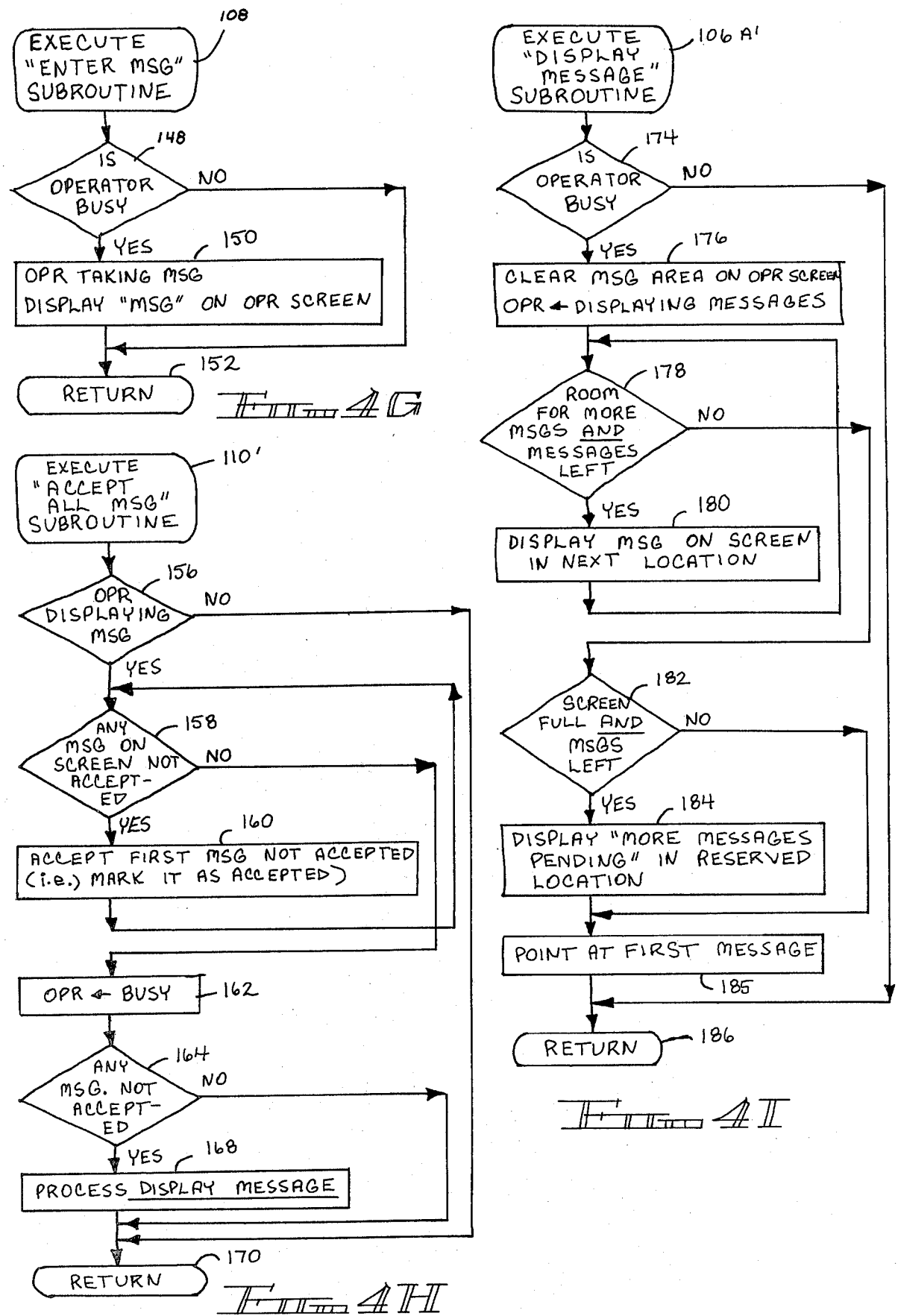

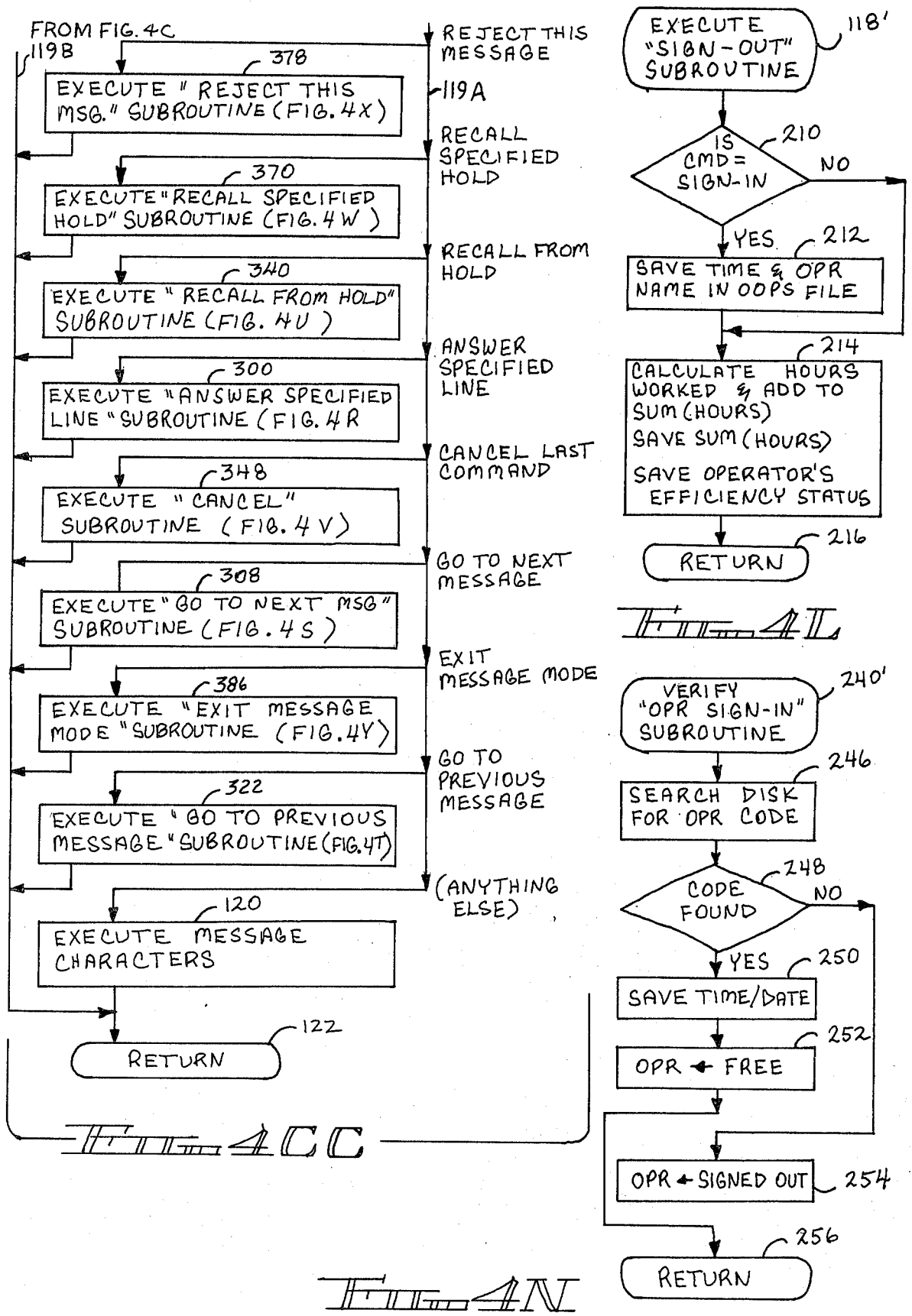

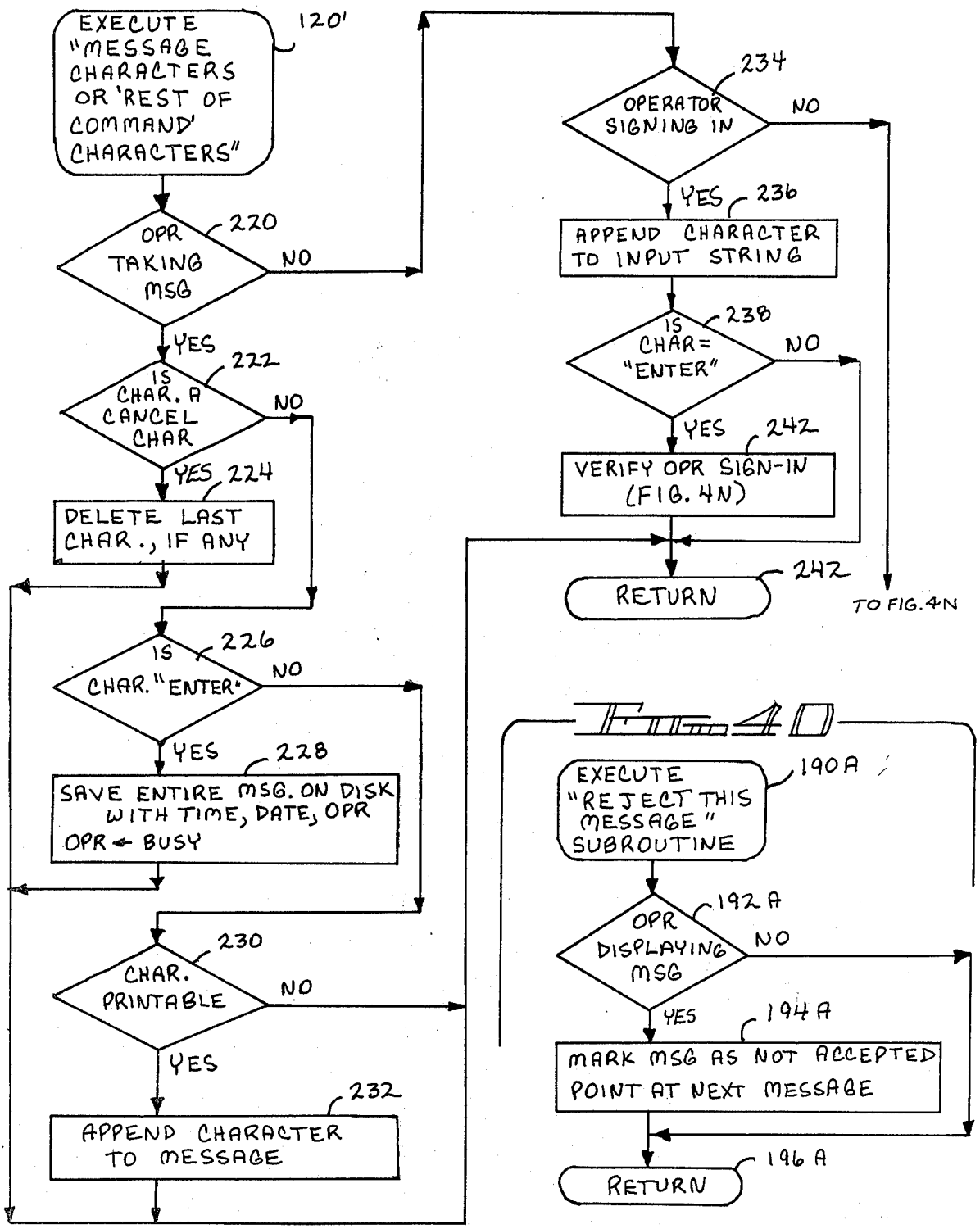

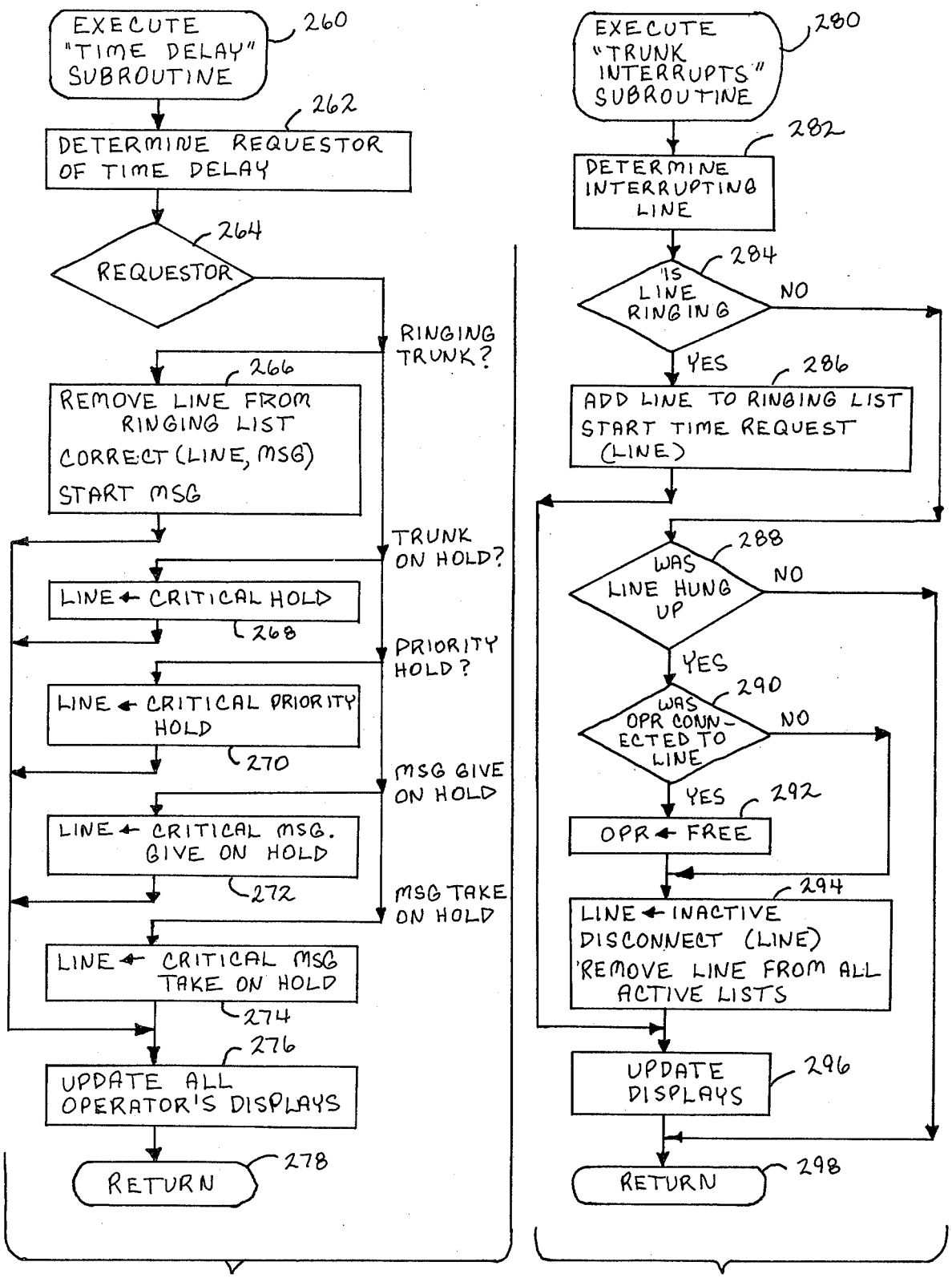

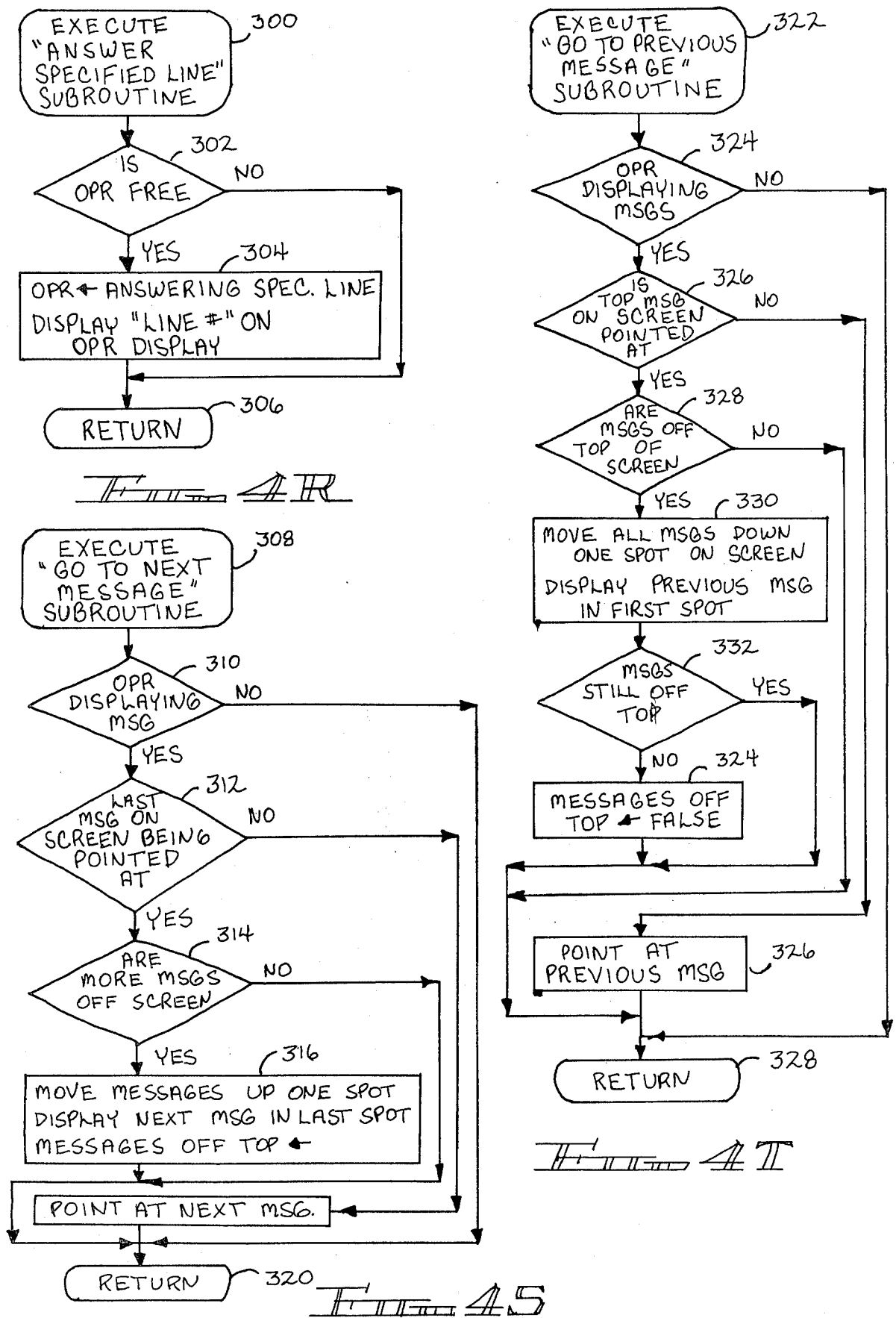

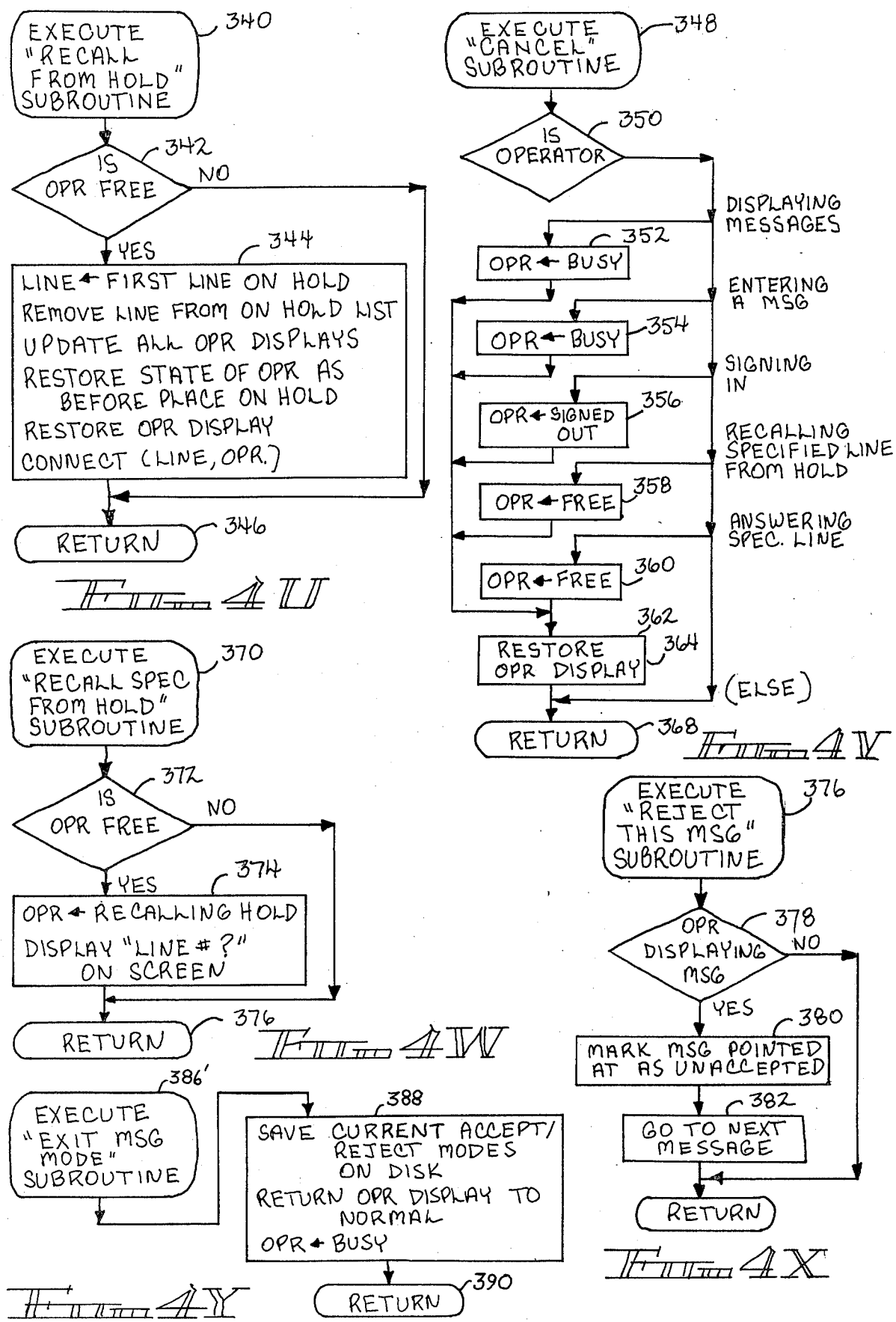

4,375,582

TELEPHONE ANSWERING SYSTEM AND METHOD

BACKGROUND OF THE INVENTION

1. Field of the Invention

The invention relates to telephone answering systems, particularly to a telephone answering system that includes a processor, a memory, a CRT display, and a keyboard.

2. Description of the Prior Art

A variety of commercial telephone answering systems are known, all of which include voice couplers for controllably connecting a plurality of telephone company trunk lines (hereinafter trunks) to a plurality of respective operator headsets. Usually, approximately four trunks are coupled to the answering systems for every one hundred subscribers to a telephone answering system. Typically, four operators are provided for each four trunks. The operator answers calls coming in on the trunk coupled to their respective headsets, and takes messages for the various subscribers being called by hand writing the messages on slips of paper. The slips of paper for each subscriber are then filed in some manner which allows them to be rapidly reached by the operator when that subscriber phones for his messages. Subsequently, when a subscriber phones to get his messages, the operator then retrieves the slips of paper on which that subscriber's messages have been written and reads those messages to him. The message slips then are retained by the telephone answering service and are used for billing purposes. One known answering system uses a CRT display to display the status of the trunk lines connected to that answering system and also to display subscriber information, such as a subscriber's name and address, and any special answering instructions for a ringing line, when a call to that subscriber is answered. However, all of the known telephone answering systems require the answering operators to physically write the incoming messages on slips of paper, file the message slips, retrieve the subscriber's file of message slips when the subscriber calls in for his messages, and read the message slips over the telephone to the calling subscriber. Message slips are occasionally lost or misfiled. The times required to physically write the messages on the message slips, file them and retrieve them when the subscriber calls in are unduly great. It is inconvenient to operate the prior telephone answering systems so that an operator other than the one who places a particular caller on hold can remove that caller from hold if a predetermined hold time elapses, because the second operator does not have convenient access to the message slip on which the first operator may have written a message taken from the particular caller. Consequently, an unduly large number of operations are required for operation of known telephone answering systems. Furthermore, there are no satisfactory systems for efficiently alerting all operators if a caller remains on hold too long to thereby cause the first available operator to remove that caller from hold and finish taking his message. There is a presently unmet need for a telephone answering system which is economical and yet reduces the foregoing times required by use of the message slips.

Accordingly, it is an object of the invention to provide a telephone answering system and method which obviates the need for use of paper message slips and avoids the inefficiences and errors which result from use of paper message slips.

It is another object of the invention to reduce the amount of time required for an operator to service calls in a telephone answering system.

It is another object of the invention to provide a telephone answering system and method that instantly indicates to an operator status of all trunk lines assigned to that operator and displays subscriber information corresponding to each incoming call and allows messages taken to be typed into the system, stored, and later retrieved and displayed to an operator.

It is another object of the invention to provide a telephone answering system and method which enables a subscriber to instantly receive an automatic display of messages which previously have been called into and entered into the telephone answering system.

It is another object of the invention to provide a telephone answering system and method which increases the efficiency of evaluating operator's performance and billing of subscribers.

It is another object of the invention to provide a telephone answering system and method which automatically assigns a "critical hold" status to any caller who has been on hold for more than a predetermined time, alerts all operators to that caller's status and allows the first available operator to efficiently service the caller and finish taking a message from him.

It is another object of the invention to provide a telephone answering system which can efficiently service a particular number of subscribers with fewer operators than prior telephone answering systems.

SUMMARY OF THE INVENTION

Briefly described, and in accordance with one embodiment thereof, the invention provides a telephone answering system and method for utilizing a processor, a memory for storing typed-in alphanumeric messages for various subscribers, a keyboard device, and a display device for displaying status of trunks coupled to the answering system, alphanumeric subscriber information for incoming calls to that subscriber, alphanumeric messages for various subscribers retrieved from the memory or being typed in by an operator by use of the keyboard means, and indicators for indicating whether or not the retrieved alphanumeric subscriber messages have been accepted by the appropriate subscriber. In the described embodiment of the invention, the display device includes a CRT and the keyboard device includes a conventional typewriter keyboard and a command key pad. The processor receives character codes and command codes from the keyboard and causes the CRT to display, in order of occurrence, the line numbers of each of the "ringing" trunk lines. The CRT also displays, in order of occurrence, each of the callers (trunk lines) placed on "hold". If a particular caller remains on "hold" status for longer than a critical time, a "critical hold" indicator is displayed on all CRT's in the system so that the next available operator can service that caller.

When an operator answers a ringing trunk, she presses an "answer" key or an "answer specified line" key. Pressing of the "answer" key causes the processor to electrically couple the first ringing trunk to that operator's headset, whereas if the "answer specified line" key is depressed, the trunk number specifying another of the ringing trunks must be typed into the keyboard. Note that each trunk has a "line number"

assigned thereto. This line number can be also thought of as a caller number. Conventional hybrid circuits convert each trunk to a receive line and a transmit line, each of which has the same line number as their corresponding trunk. This causes the specified ringing trunk to be electrically coupled to that operator's headset. In either event, the processor causes the display to be modified to display the present time and date, the number of ringing lines, and the number of lines on hold at the top of the CRT screen. The processor also automatically accesses the memory, which includes a disc unit, and automatically fetches and displays subscriber information corresponding to the answered trunk in a portion of the remaining screen area. In order to access the memory to obtain the subscriber information, the processor uses an address obtained by decoding of DID (direct inward dialing) tones generated by the answered trunk as soon as it is coupled in response to a signal from the processor by means of a voice coupler coupling the answered trunk to a two-to-four wire hybrid connected to a cross point matrix. The cross-point matrix couples the answered trunk line to a particular operator in response to cross-point matrix addresses generated by the processor on the basis of stored status variables which are continually updated to represent the current status of each operator and trunk in the system. The processor reserves a portion of the screen area for typed-in alphanumeric messages taken from the present caller, accepts character codes from the keyboard as the operator types in the message being dictated by the present caller, and effects display and, if necessary, removal of such characters to allow editing of the message being typed in. The processor responds to depressing of an "enter" key to load a displayed message just typed into the disc unit. The processor responds to depression of a "hold" key to place the line presently being answered on "hold status" and by starting a timer which causes display of a "critical hold" message on every CRT of the system if that line is not removed from hold status within a predetermined "critical hold time". Placing of a line on hold status allows an operator to answer another ringing line or remove another line from hold status. The processor effects removal of a line from hold status by responding to depression by an operator of a "remove from hold" key and, if a line other than the line first placed on hold status is to be removed from hold status, also typing in of the line number of the line to be removed from hold. The processor responds to depression of two cursor control keys to vertically and horizontally move a cursor on the CRT screen. The processor responds to depressing of an "accept message" key to display an indicator adjacent to the message pointed to by the cursor to show that that message is "accepted"; this is done after the message has been given to the subscriber when he phones in to receive his messages. The processor also responds to a "sign in" key to log in an operator who is beginning a work shift and to a "sign out" key to log off the operator when she completes the work shift. The processor computes and stores the number of hours worked on the shift, computes the cumulative number of hours worked in the present pay period, records the number of calls taken by that operator during the previous work shift, and records and/or computes any other useful statistics. In one embodiment of the invention, a serial communication link is provided between the processor and a cross point matrix circuit to effect direct digital, rather than analog communication between the processor and a selected trunk. A remote subscriber terminal also includes a communication link which is coupled to a CRT, enabling direct digital communication between the remote subscriber terminal and the processor of the telephone answering system. The subscriber dials the answering system. The processor of the answering system then fetches and transmits the entered messages via the trunk from the disk unit to the remote subscriber terminals, which displays them on the CRT screen thereof. The subscriber accepts or does not accept the displayed messages by deploying cursor control and "accept message" keys on the remote terminal, causing this information to be transmitted back to the answering system, which then designates the accepted messages as being accepted. The subscriber can include a printer which prints out the messages in response to an appropriate command from the subscriber keyboard. The answering system stores all messages for a predetermined time, and can print them all out for each subscriber in response to an appropriate command. The answering system includes means for connection to a cassette tape recorder so that a record of all messages will be preserved in the event that data in the disc unit is destroyed as a result of a power failure.

BRIEF DESCRIPTION OF THE DRAWINGS

FIG. 2 is a block diagram of the answering system of FIG. 1.

FIG. 3B is a schematic diagram of addressing circuitry associated with the cross point matrix of FIG. 1.

FIG. 3C is a schematic diagram of a portion of the trunk control card of FIG. 1.

FIG. 3CC is a schematic diagram of another portion of the trunk control card of FIG. 1.

FIG. 3D is a schematic diagram of another portion of the trunk control card of FIG. 1.

FIG. 3E is a schematic diagram of a representative voice coupler of the system of FIG. 1.

FIG. 3F is a schematic diagram of part of the trunk tone decode circuit of FIG. 2.

FIG. 3G is a schematic diagram of another part of the trunk tone decode circuit of FIG. 2.

FIGS. 4A-4Y constitute a flow chart of a program executed by the CPU of FIG. 1 to effect operation of the telephone answering system of FIG. 1 in accordance with the present invention.

DESCRIPTION OF THE INVENTION

Figure 1A:
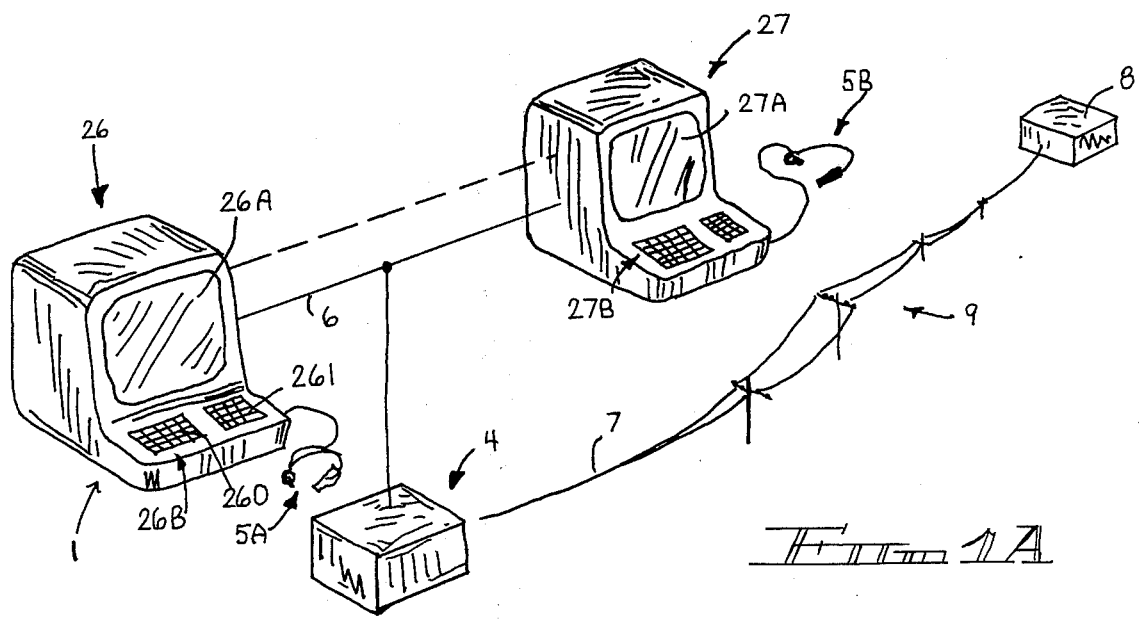
FIG. 1A is a perspective view illustrating one embodiment of the telephone answering system of the present invention.

Referring to FIG. 1A, answering system 1 includes an operator console 26 which includes a computer (computer 17 of FIG. 2) and three additional operator stations such as 27. (In FIG. 2, reference numerals 26 and 27 are also used to designate operator CRT/Keyboard units only.) Referring again to FIG. 1A, console 26 includes a keyboard 26B having a conventional typewriter key pad 260 and a command key pad 261. Console 27 also has a keyboard 27B. Consoles 26 and 27 also have CRT displays 26A and 27A, respectively, on which present time and date, trunk status for all telephone company trunks, subscriber information, subscriber messages in alphanumeric form and various other information can be displayed.

In FIG. 1A, reference number 6 designates a generalized bus coupling computer/operator console 26 and the three remaining operator consoles. Bus 6 is connected to a housing 4 which includes the circuitry exclusive of computer 17 and consoles 26 and 27 shown in FIG. 2. Bus 6 incorporates various buses shown in FIG. 2, subsequently explained in more detail. Operator consoles 26 and 27 are connected by means of suitable operator buses 50A and 50B to four operator headsets 36B and 37B, respectively. Housing 4 is connected by means of wire 7 and telephone lines 9 to a typical telephone company switching system 8 by means of which any caller or subscriber can call telephone answering system 1.

Figure 1B:
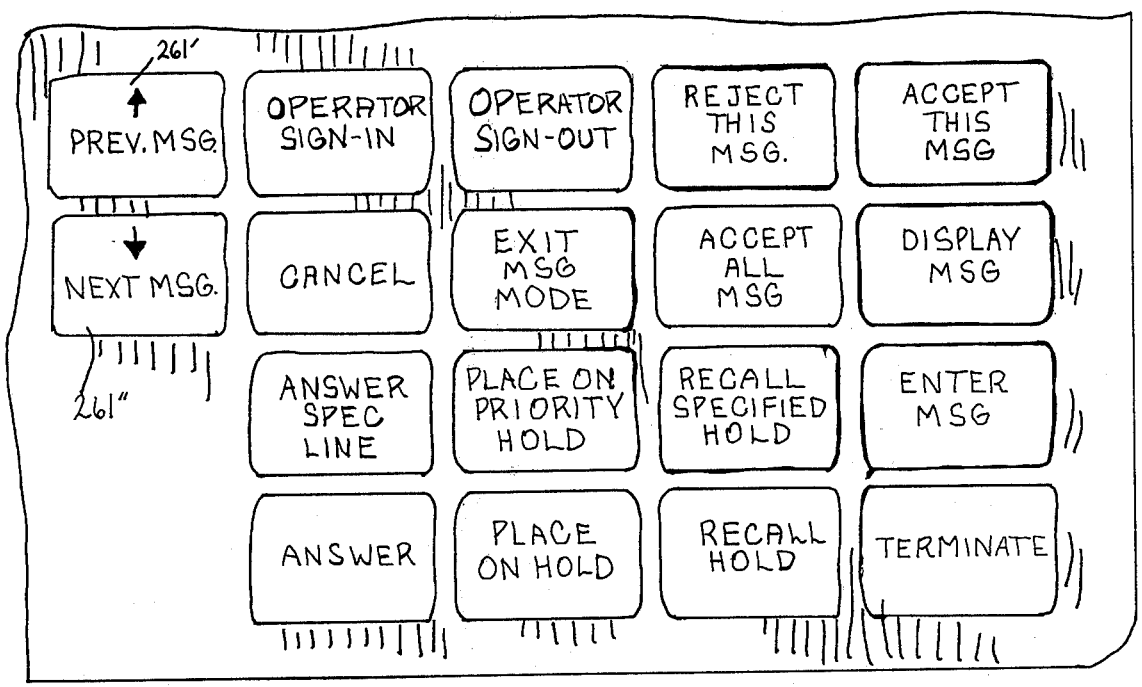
FIG. 1B is an enlarged diagram of the control key pad keyboard of FIG. 1A.

FIG. 1B is an expanded view of command control key pad 261, and illustrates the various command keys thereof, subsequently described.

FIG. 1B discloses command key pad 261 of console 26 in FIG. 1A, including two cursor control keys 261' and 261", which are utilized to move a cursor on the CRT screen to point at displayed subscriber messages, as subsequently explained.

The "operator sign in" key is depressed by an operator, followed by typing in of her identification number, when that operator signs in at the beginning of a work shift. When the operator leaves at the end of the workshift, she depresses the "operator sign out" key of FIG. 1B.

The "cancel" key is depressed if the operator desires to cancel the last command which the operator entered into keyboard 26B. The "answer" key is depressed when the operator wishes to answer the one of the presently ringing trunks which began ringing first. The "answer specified line" key is depressed if the operator wishes to answer a different one of the presently ringing trunks than the one which began ringing first; in this case, after the "answer specified line" key is depressed, the line number of the ringing trunk to be answered is typed in by means of typewriter key pad 260.

If the operator desires to "take a message" from the caller on the trunk being answered, she depresses the "enter message" key and then begins typing a message spoken by the caller. After the message has been completely typed, she depresses the "carriage return" key of typewriter key pad 260 to cause the typed-in subscriber message to be loaded into disc unit 16A (FIG. 2). If the caller on the trunk being answered is the subscriber who wishes to have his messages read to him, the operator depresses the "display message" key, which causes his unaccepted messages to be retrieved from disc unit 16A and displayed on CRT screen 26A.

The operator then reads the displayed messages to the calling subscriber. The subscriber indicates whether he will accept or reject each message. (In some cases, various messages may be intended for various employees of the subscriber.) A message is not designated by the answering system 1 as "accepted" until it has been read to the person for whom it is intended or who is authorized to accept the message. The operator depresses "previous message" key 261' and "next message key" 261" to control the above-mentioned cursor, which automatically moves to a position adjacent to the message displayed above or below the displayed message presently being pointed to by the cursor. The operator then depresses the "reject this message" key to "reject" the message now pointed to by the cursor, or depresses the "accept this message" key to designate as "accepted" the message pointed to by the cursor. If all displayed messages are to be accepted, then operator merely depresses the "accept all messages" key, without deploying the cursor control keys 261' and 261".

If the operator wishes to terminate or "hang-up" on the trunk previously being answered, she depresses the "terminate" key. If she wishes to place the trunk presently being answered on hold, she depresses the "place on hold" key. If she wishes to place the trunk presently being answered on priority hold, she depresses the "place on priority hold" key. If the operator wishes to recall from hold status the one of the lines presently on hold status which was first placed on hold, she depresses the "recall hold" key. If she wishes to recall from hold a specific one of the trunks presently on hold, she depresses the "recall specified hold" key and then types in the trunk number of that trunk by means of keyboard 260.

Next, several examples of the displays which appear on CRT screens 26A and 27A are set forth. For example, when a particular operator is free, her CRT display might appear as follows:

| NOVEMBER 15, 1980 | FRIDAY | 12:45 PM |
|---|---|---|
| RINGING | | |
| 03 | | |
| 07 | | |
| ON HOLD: | | |
| 4  05 | MARKS WELDING | 848 |
| 3  02 | JANS LAUNDRY | 346 |

This display indicates that the operator is free, and that trunk members 3 and 7 are ringing, that trunk 3 started ringing first, that trunk 5 (Mark's Welding, Account Number 848) was placed on hold by operator number 4, and after that trunk 2 (Jan's Laundry, Account No. 346) was placed on hold by operator number 3.

If a particular operator is busy, i.e., is answering a call, her CRT display might be as follows:

| NOVEMBER 15, 1980 | |
|---|---|
| 3 LINES RINGING | 4 LINES on hold |
| 01      845      JONES MFG. | |
| ANSWERED: DAVEY JONES | |
| PERSONS ALLOWED TO TAKE MESSAGES: | |
| DAVEY JONES | |
| MARGARET JONES | |
| HOURS OPEN: 8-6, M-F | |
| HOURS OF ANSWERING SERVICE: 6-8, M-F | |
| 8:00 AM-7:00 PM SAT., SUN | |

When an operator is answering a call, the display on her CRT screen indicates the number of trunks ringing, the number of trunks on hold, and the trunk number, subscriber account number and name of the subscriber to whom the call is being made, and subscriber information which enables the operator to easily answer questions frequently asked by callers to that subscriber. The foregoing display leaves sufficient room on the CRT screen below the above indicated display to allow display of messages orally given to the operator from the present caller.

If the caller is a subscriber requesting that the operator read to him messages previously called in, the display might be as follows:

```
FRIDAY    NOVEMBER 15, 1980    12:45 PM
3 LINES RINGING    2 LINES ON HOLD
01  845   DAVEY JONES
MESSAGES:
    A   CALL DAN AT 831-4142
    →   EMERGENCY MEETING AT 7:00 PM - DALE
        CALL MARK 899-7249
```

The messages above are displayed when the operator depresses the "display messages" key of key pad 261 (FIG. 1B). The "A" indicates that the adjacent message has been "accepted" by the subscriber. The arrow indicates that the adjacent message is the message being pointed at. Note that when the "display message" key is depressed, only non-accepted messages for the calling subscriber are displayed on the appropriate operator's CRT screen.

When the operator places the present caller on hold, the above-described display for a free operator occurs on her CRT screen.

If the operator recalls a trunk which is presently on hold, the following display might be presented:

```
FRIDAY    NOVEMBER 15, 1980    12:45 PM
RINGING:  07
          03
ON HOLD:
4   02   848   MARKS WELDING
4   05   147   DANS DRAPERIES
RECALL LINE NO?
```

This display indicates that trunks 7 and 3 are ringing and that trunks 2 (Marks Welding, Account No. 848) and 5 (Dan's Draperies, Account No. 147) are on hold. The characters "RECALL LINE NO?" constitute a prompter message informing the operator that she should type "02" into her keyboard to recall Marks Welding from hold status in order to service trunk No. 2.

If the operator has answered a particular trunk, and the caller has indicated that he wishes to leave a message for the subscriber, the operator depresses the "enter message" command key on key pad 261 (FIG. 1B). This might cause the following display to appear on that operator's CRT screen:

```
FRIDAY    NOVEMBER 14, 1980    6:45 PM
3 LINES RINGING    2 LINES ON HOLD
01   845   DAVEY JONES
OWNER:  DAVEY JONES
PERSONS ALLOWED TO TAKE MESSAGES:
    DAVEY JONES
    MARGARET JONES
HOURS OPEN:  8-6, M-F
ANSWERING SERVICE HOURS:  6-8, M-F
MSG?  PLEASE CALL MARK AT 945 6321
```

The characters "MSG?" serve as a prompter informing the operator to type into her keyboard the message spoken by the present caller. When the operator presses the "carriage return" key, this message is stored in disc unit 16A.

If the operator wishes to answer a specified one of the ringing trunks, rather than the one which began ringing first, she must depress the "answer specified line" command key. This might cause the following display to appear:

```
NOVEMBER 15, 1980    6:45 PM
RINGING:  01
          07
          03
ON HOLD:
4   04   848   MARKS WELDING
ANSWER LINE NO.?
```

The characters "ANSWER LINE NO?" are a prompter message informing the operator that she should type 07 by means of her keyboard. This will cause the operator to be connected to trunk 7. This will also cause the display to switch to the previously mentioned display which results when the operator is talking to a caller.

Various other displays for informing and prompting the operators can be utilized, and the foregoing displays are merely illustrative. Those skilled in the art can readily modify the subroutines executed by computer 17 to provide satisfactory displays, which need not be exhaustively illustrated here.

Referring now to FIG. 2, computer 17 includes a processor or CPU 17B, memory cards 17A, 17C and 17E, a serial input/output unit 17D and a video processor unit 17F, all connected to an internal bus 22C. Computer 17 can be implemented by means of a Hartronix 4S32 computer, manufactured by Hartonix, Inc. located in Tempe, Arizona. Bus 22C includes address, data, and control conductors. Two operator consoles 26 and 27 are connected by means of buses 25A and 25B, respectively, to video processor 17F. As subsequently explained, the system shown in FIG. 2 includes two additional operator consoles, which, for convenience, are not shown. Console 26 includes a CRT 26A and a keyboard 26B. Console 27 includes a CRT 27A and a keyboard 27B. Keyboards 26B and 27B each include a standard ASCII keyboard arrangement and also a "four by four" control key pad as indicated by reference numerals 260 and 261, respectively.

Computer 17 includes input/output ports 19A, 19B, 19C, and 19E connected, respectively, to memory card 17A, central processor unit (CPU) 17B, memory and memory card 17C and 17E. These input/output ports contain the necessary driver circuitry, latches, and connections to the appropriate address and data terminals of CPU 17B and memory cards 17A, 17C and 17E to provide satisfactory interfacing between computer 17 and cross point bus 22A, trunk control bus 22B, printer/cassette bus 22D, and disc controller bus 22E.

Figure 3A:
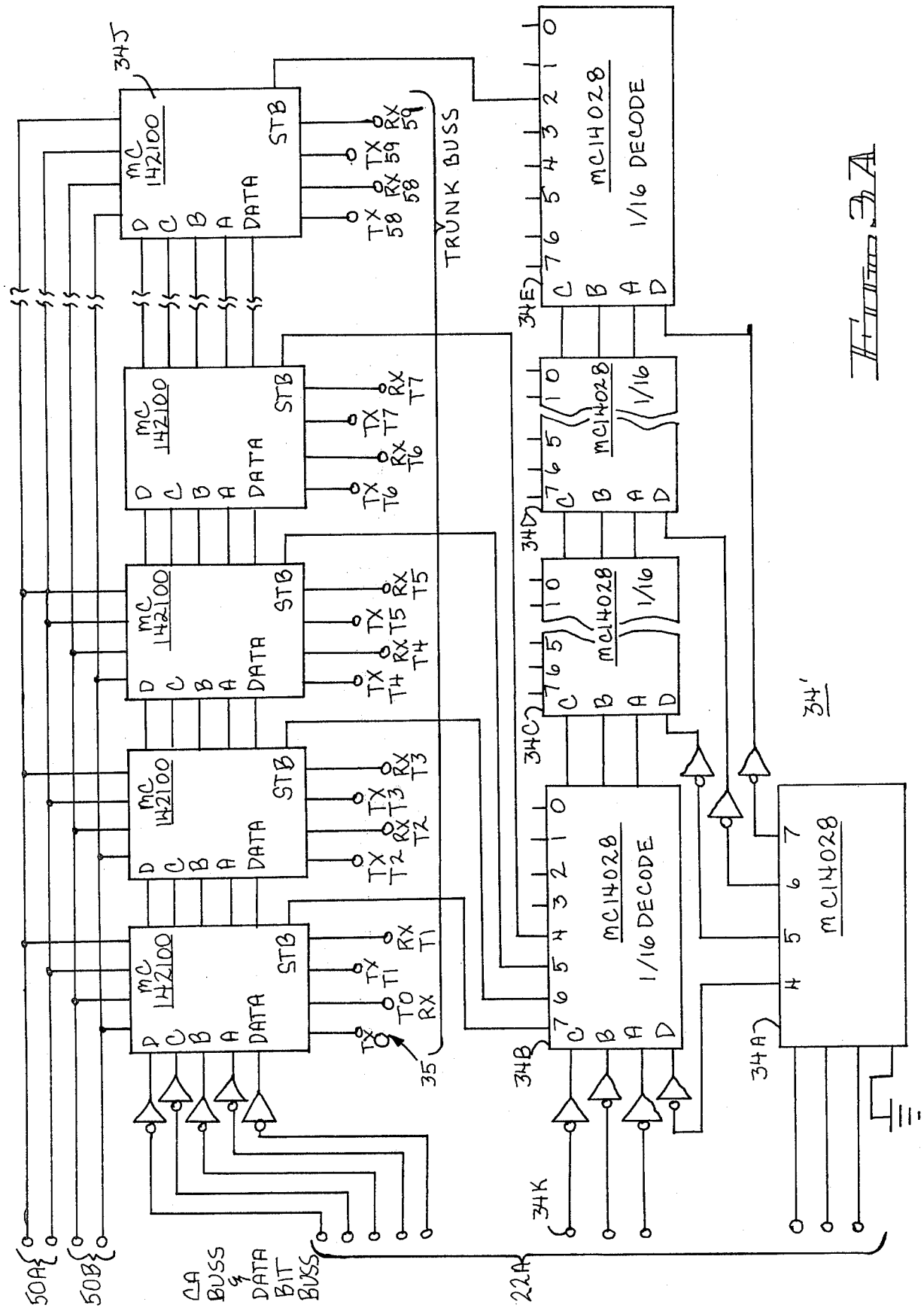
FIG. 3A is a schematic diagram of a representative portion of the cross point matrix of FIG. 1.

Cross point bus 22A is connected to address inputs of cross point matrix circuits 34, 40, and 42. The implementation of cross point matrix circuit 34 is shown in FIGS. 3A and 3B. More specifically, cross point matrix circuit 34 includes two printed circuit cards each including the circuitry shown in FIGS. 2A and 2B, thereby accommodating four operators. The implementation of cross point matrix circuits 40 and 42 is similar, and is not shown in detail. Each of cross point matrix circuits 34, 40, and 42 includes sixteen inputs connected to corresponding respective conductors of bus 35, hereinafter referred to as trunk bus 35. The respective conductors of trunk bus 35 are connected to the outputs of trunk interface circuitry 38, which contains eight two-to-four wire converter circuits commonly known as "SLICS" on "hybrids". The inputs of trunk interface circuitry 38 are connected to corresponding respective outputs of voice coupler circuitry 38A, which includes eight FCC approved voice coupler circuits. The voice coupler circuits of circuitry 38A have inputs connected directly to each of the eight two-wire trunk lines designated by reference numeral 39 to which the telephone answering system is connected. The voice coupler circuits 38A also each have control inputs and status output conductors contained in bus 41 for sending trunk status information to processor 17B via trunk control circuitry 32, trunk control bus 22B, and internal bus 22C. The control conductors of bus 41 receive control information outputted by internal bus 22C by processor 17B and transmitted by trunk control bus 22B and trunk control circuitry 32 to voice couplers 38A.

Cross point matrix circuit 34 is connected to four operator headset units (only two of which are shown) such as headset units 36 and 37. Operator headset unit 36 includes headset amplifier 36A having an input connected to cross point matrix circuit 34 and a headset 36B worn by an operator. Headset 36B includes an earpiece including an audio transducer for generating audio tones in an ear of the operator and a microphone for converting the operator's speech to electrical signals which are transmitted to cross point matrix circuit 34. Similarly, headset 37 includes a headset amplifier 37A and a headset 37B.

In operation, a ringing one of the eight trunks 39 connected to voice coupler circuitry 38A causes it to generate a status interrupt signal which is routed to processor 17B, via trunk control circuit 32. Processor 17B then generates a digital control signal which is routed back to voice coupler circuit 38A via trunk control circuit 32. This control information causes an internal relay of the individual voice coupler circuit to which the ringing trunk is connected to be closed, thereby connecting both wires of that trunk to corresponding inputs of a hybrid (two-to-four wire converter) contained in interface card 38. The output of that hybrid includes a receive line and a corresponding transmit line connected to an appropriate receive line and transmit line of trunk bus 35. Processor 17B also generates a cross point address on bus 22A to effect coupling of the appropriate transmit/receive pair of trunk bus 35 to the appropriate one of operator headset units 36 or 37.

Note that in order to produce the necessary cross point address on bus 22A to effect connecting or disconnecting of a particular trunk from a particular operator, processor 17B needs to utilize the information produced by trunk tone decode circuit 29, identifying the subscriber to whom the present call is being made and must also review all of the status information corresponding to the present status of each trunk and each operator on duty in order to determine which operator should now be connected by means of cross point matrix 34 to which trunk. In some cases, characters or commands received from the keyboard must also be utilized in making this determination.

Processor 17B also accesses disc unit 16A by outputting address and control information to disc controller/driver 16, and loads data representing subscriber information for the presently answered trunk into the memory including memory cards 17C and 17E, which together contain 6,000 consecutive words (hexadecimal).

Cross point matrix 40 includes two lines 33A and 33B, each including a transmit conductor and a receive conductor, coupled by means of modem 48 to corresponding input/output terminals of serial input/output unit D of computer 17, so that one of trunks 39 presently being answered is directly coupled to processor 17B via serial input/output unit 17D.

Cross point matrix 42 is connected to a "music on hold" module 44 and a "recorded message" module 46. If a ringing trunk rings for longer than a predetermined time, processor unit 17B addresses cross point matrix 42, causing recorded message module 46 to generate a recorded message on the appropriate conductors of trunk bus 35 and also sends a control signal via trunk control card 32 to cause voice coupler circuit 38A to electrically connect that ringing trunk to trunk interface circuit 38, which directly couples the ringing trunk to the same trunk bus by means of voice coupler circuit 38A.

If a particular trunk has been placed on "hold" status by the operator by depressing the "hold" key, processor 17B generates appropriate cross point addresses on bus 22A to cause connecting of recorded music module 44 directly to the trunk placed on hold status.

The above mentioned hybrid included on trunk interface card 38 can be implemented by a Model 169230 or 169231 voice coupler, manufactured by Pulsecom. Computer 17 can be implemented by means of a Hartronix 4S32 16 bit minicomputer.

FIG. 3E shows a schematic of one of the eight two-wire to four-wire converts, i.e., hybrids, designated by reference numeral 38, contained in trunk interface circuit 38 of FIG. 2. The hybrid shown in FIG. 3E can be implemented by means of an ITT Corporation Model 3084 two-wire-to-four-wire converter. Terminals 38A and 38B of hybrid 38' are connected to one pair of trunk outputs of an individual voice coupler circuit 38A, and transmit terminal 38C and receive terminal 38D are connected, respectively, to a pair of corresponding conductors of trunk bus 35. The circuitry contained in one of the cards included in cross point matrix circuit 34 of FIG. 2 is shown in FIG. 3A.

One of the two cross point matrix cards 34, the circuitry of which is shown in FIG. 3A, is selected by means of a selection circuit shown in FIG. 3B. Eight cross point matrix address inputs designated CA9-16, are connected to respective inputs of digital comparators 34L and 34M, as shown. The corresponding digital inputs of comparators 34L and 34M are connected to the illustrated strapping switches, which are preset so that a particular cross point matrix card is selected when the preset code is matched by the cross point addresses CA9-16. When this happens, a select signal is produced on select conductor 34K. Select conductor 34K is connected to a one-of-16 decode circuit 34A in FIG. 3A. In FIG. 3A, each cross point matrix card such as 34' includes five one-of-16 decoder circuits 34A, 34B, 34C, 34D, and 34E, connected as shown, each being implemented by a Motorola MC14028 one-of-16 integrated circuit decoder. The eight respective outputs of one-of-16 decoders 34B, 34C, 34D and 34E are connected to the respective strobe inputs of 32 four-by-four cross point switch integrated circuits 34F, 34G, 34H, . . . 34LL, each of which is implemented by means of a Motorola MC142100 cross point switch integrated circuit. Each of the four-by-four cross point switch integrated circuits has four cross point address inputs A, B, C and D coupled, respectively, by means of the shown inverters to conductors CA0, CA1, CA2, and CA3 of crosspoint bus 22A, as shown. The A, B, and C inputs of one-of-16 decoders 34B, 34C, 34D and 34E are coupled by means of the shown inverters to conductors CA4, CA5 and CA6, respectively, of cross point bus 22A.

Conductors CA7 and CA8 of cross point address bus 22A are connected to the input of one-of-16 decoder 34A, four outputs of which are connected by means of the shown inverters to the D inputs of one-of-16 decoders 34B, 34C, 34D and 34E, respectively. The outputs of each of the 32 four-by-four cross point switch circuits 34F–34LL are bussed to corresponding ones of conductors $TX_0$ and $RX_1$ of operator bus 50A and conductors RX1 and TX1 of operator bus 50B leading to the above mentioned operator headset units 36 and 37, respectively.

Trunk control circuit 32 of FIG. 2 includes the circuits shown in FIGS. 3C and 3D. The circuit 32' shown in FIG. 3C is repeated eight times in trunk control circuit 32. The circuit shown in FIG. 3C includes three trunk status inputs, designated by reference numeral 41A, connected to the C1, CRV1, and CBS2 outputs of one of the eight above-mentioned voice couplers of circuit 38A (FIG. 2). The C1 output of each individual voice coupler circuit indicates that the corresponding trunk is ringing, the CRV1 output indicates that the trunk is being answered and the CBS2 output indicates that the polarity of batteries connected to the trunk line has been reversed, indicating that the caller has just hung up. The three trunk status conductors 41A are connected to the three inputs of a contact bounce elimination circuit, which can be implemented by means of a Motorola MC14490 integrated circuit. The three corresponding outputs of contact bounce eliminator circuit 32D are connected to corresponding inputs of three-state bus driver circuits that are implemented by means of a quad three-state bus driver integrated circuit, implemented by means of a Motorola MC14503 integrated circuit. The three corresponding outputs D0, D1 and D2 are connected to conductors collectively indicated by reference numeral 29D in FIG. 3D.

In FIG. 3C, an answer data bit 41B, produced on trunk bus conductor TD5 (FIG. 3D) and buffered by means of integrated circuit buffer 32N, is connected to the D input of quad D latch integrated circuit 32C, which can be implemented by means of a Motorola MC14175 integrated circuit. Conductor 41B is common to all eight of circuits 32' shown in FIG. 3C. The Q output corresponding to the answer conductor 41B is connected to an input of three-state bus driver integrated circuit 32B. A corresponding output conductor, designated D5, is connected to the D5 input of three state buffer circuit 32N of FIG. 3D. The corresponding Q output of circuit 32C is connected to the base of output transistor 32I. The collector and emitter of transistor 32I are connected to conductors 21A and 21B, respectively, which are connected to control inputs of the voice coupler circuit to which circuit 32' is connected. When transistor 32I is turned on, the relay coupling a trunk line input to one of the hybrids of card 38 (FIG. 2) is closed, thereby providing an analog coupling of that trunk line to the corresponding hybrid input.

The circuit of FIG. 3C includes three exclusive OR circuits 32F, 32G and 32H, the outputs of which are ORed by means of OR gate 32E. An interrupt signal is produced on conductor 32A, and is designated $RI_X$ (ring interrupt); the eight such conductors $RI_{0-7}$ are designated by reference numeral 32A in FIG. 3D. One input of each of the exclusive OR circuits is connected to a corresponding Q output of one of the D type latches in latch circuit 32C. The other input of each of the exclusive OR gates is connected to a corresponding one of the three outputs of contact bounce eliminator circuit 32D as shown. Thus, anytime there is a change of status (as described above) of any of the eight trunk lines 39, a logical "1" is produced at the output of one of the above-mentioned exclusive OR gates, generating an interrupt signal on conductor 32A. This interrupt signal is operated on by interrupt priority encoder 23 of FIG. 3D, which includes priority encoder circuits 32R and 32Q and also includes OR gates 29A, 29B, and 29C. Priority encoder 23 also generates a signal on conductor 32R', which signal is inverted and applied to the base of transistor 32S, the collector of which is connected to an interrupt signal on conductor 49. The interrupt signal INT on conductor 49 is connected to an interrupt input of processor 17B (FIG. 2), thereby causing processor 17B to execute an interrupt service routine, depending upon the prior information represented by conductors TI0–TI3 of trunk bus 22B (FIG. 3D).

The priority identification of the highest priority one of interrupt signals RI0–15 is represented by the states of four outputs TI0–TI13 of buffer 32L in FIG. 3D. Priority encoder circuits 32R and 32Q can be implemented by means of Motorola MC14538 and MC14532 encoder integrated circuits, respectively. Three-state buffers 32L, 32M and 32N can be Motorola MC14503 integrated circuits.

Referring to FIG. 2, trunk tone decode circuit 29 can be implemented by means of the circuit shown in FIGS. 3F and 3G. The decode circuit 29 is coupled between the respective TX (receive line) outputs of the two-wire to four-wire hybrids of trunk interface circuit 38 (see reference numeral 35 of FIG. 3A) and the conductors represented by reference numeral 29D of the trunk control circuit shown in FIG. 3D. After a particular ringing trunk 39 has been electrically coupled by means of one of the eight voice couplers in circuitry 38A to one of the hybrids of trunk interface circuit 38, the telephone direct inward dialing (DID) system automatically generates a sequence of "tones" which are decoded by trunk tone decode circuit 29 to generate a digital number identifying the subscriber to whom the incoming call is being made. This information is transmitted via port 19E and internal bus 22C to processor 17B. Processor 17B then utilizes this information to determine the account number, the cross point matrix address required to connect the next free operator to the ringing trunk, and the address required in order to automatically fetch the corresponding subscriber information from disc unit 16A.

Note that processor 17B refers to the stored status variable corresponding to all operators and all trunks to determine which operator is to be connected to which trunk and accordingly, generates the necessary cross point address on bus 22A to effect such connection.

As a result, processor 17B produces address signals on internal bus 22C, resulting in trunk address signals TA0–TA7 of trunk bus 22B being produced. These signals are decoded by one-of-16 decoder 32K (FIG. 3D) to produce an appropriate "enable trunk" signal on one-of-16 conductors 31A and 31A'. These enable trunk signals are designated by $ET_0$–$ET_{15}$ in FIG. 3D and by $ET_x$ in FIG. 3C. The $ET_x$ serves as a clock input to the D-type latches 32C in FIG. 3C. The positive edge of the enable trunk signals $ET_x$ trigger the D type latches, updating the status changes produced by the above mentioned change of trunk status lines 41A, resets the interrupts and clocks the voice coupler in circuit 38A.

The details of the trunk tone decode circuit 29 are shown in FIGS. 3F and 3G. The circuit shown in FIGS. 3F and 3G is repeated eight times. Each of the eight transmit (TX) outputs of the respective hybrids of block 38 (FIG. 2) is connected to one of the eight respective circuits shown in FIGS. 3F and 3G. Each such transmit conductor TX is connected to a respective conductor 35′, as shown in FIG. 3F. Conductor 35′ is connected to inputs of a DTMF (dual tone multi-frequency) high group filter integrated circuit 29A and a DTMF low group filter integrated circuit 29B. Circuit 29A can be implemented by means of an ITT Model 3040 DTMF high group filter integrated circuit and circuit 29B can be implemented by means of ITT 3041 DTMF low group filter. The outputs of circuits 29A and 29B are connected to inputs of circuit 29C, which is a MOSTEK MK5102N-5 dual tone multifrequency decoder integrated circuit. A 3.58 megahertz crystal is connected to the oscillator input and oscillator output terminals of circuit 29C. The strobe (STB) output of circuit 29C is connected to conductor 29E, which generates an interrupt signal INTT when a DID (direct inward dialing) tone sequence is generated by the telephone company on the trunk being answered. Four outputs D0, D1, D2 and D3 of circuit 29 are connected to four respective conductors D0′, D1′, D2′ and D3′, collectively designated by reference numeral 29D. The four conductors 29D are connected to correspondingly designated conductors in FIG. 3G, each of which is connected to the input of a three-state bus driver 29G, which is implemented by a Motorola MC14503 integrated circuit. The outputs of circuit 29G in FIG. 3G are connected to four conductors labeled D0, D1, D2 and D5, collectively designated by reference numeral 29D and connected to the correspondingly designated terminals of FIG. 3D.

The interrupt signal INTT on conductor 29E is connected to a flip-flop 29F, which is implemented by a Motorola MC14013B integrated circuit. The Q output of flip-flop 29F is connected to conductor 32A′, and generates a tone interrupt signal $TI_x$. The eight conductors 32A′ produced by the eight individual tone decode circuits are designated $TI_0$-$TI_7'$ and are connected respectively to the correspondingly designated terminals of FIG. 3D. The three-state buffers of circuit 29G and flip-flop 29F are clocked by the enable trunk signal $ET_x$ previously described, and designated by reference numeral 31A.

Next, the program executed by processor 17B to effect the previously described operation of the telephone answering system of FIG. 1 is described.

Figure 4A:
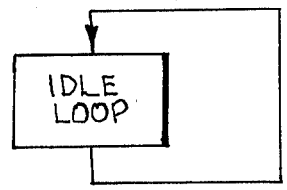

Referring now to FIG. 4A it is seen that processor 17B executed an idle loop (after initialization) of computer 17 when power is first applied to the system wherein processor 17B repeatedly executes instructions comprising the idle loop until an interrupt signal INT is received via conductor 49 of FIG. 3D. (The specific instructions for the initialization can readily be provided by any skilled programmer in the art, and therefore need not be indicated.). When the interrupt signal is received by processor 17B, the program branches from the idle loop of FIG. 4A and executes the interrupt routine of FIG. 4B.

Turning now to FIG. 4B, the interrupt routine is entered via label 90. The program causes processor 17B to disable any further interrupt signals, as indicated in block 91. Next, the program determines which of the eight trunks 39 generated the interrupt signal by reading the states of ports 19E (FIG. 2), which is connected to lines TI0-TI13 (FIG. 3D) outputted by the priority encoder 23 of trunk control card 32 (FIG. 2).

The interrupt could be a "time interrupt signal" indicating, for example, that a trunk has been ringing too long or has been on hold status too long or it can be a "character interrupt", which means that on one of the keyboards, such as 26B, a character key was depressed by an operator. A "trunk interrupt" signal is generated when the state (i.e., trunk begins ringing, caller hangs up, or operator answers ringing trunk) of one of the trunks changes.

Next, the program enters three level decision block 93 and determines whether the present invention is a "time interrupt", a "character interrupt" or a "trunk interrupt". If the present interrupt is a "time interrupt" the program enters block 94 and executes the time delay routine shown in the flow chart of FIG. 4P. (It should be noted that computer 17 has a time-incremented register which continuously outputs periodic time based signals which can be used to generate the "time interrupt" signals. If a trunk begins ringing, or is placed on hold, the program sets an appropriate software register which counts the amount of time the trunk has been on hold or ringing and generates an appropriate time interrupt signal when a predetermined amount of time elapses.)

If the interrupt is a "character interrupt", the program enters block 95 and executes the subroutine of FIG. 4C to process the characters associated with the character interrupt.

If the interrupt is a "trunk interrupt", the program enters block 96 and executes the subroutine of FIG. 4Q to process the trunk interrupt. In any of the three cases mentioned above, after processing of the various interrupt service routines, the program enters block 97, and enables any subsequent interrupts and then returns at label 98, to the idle loop.

Referring now to FIG. 4P, the program enters this "time interrupt" subroutine via label 260 and enters block 262. In block 262, the program causes processor 17B to determine the trunk number (1 through 8) which generated the time delay interrupt. The program then enters decision block 264 to determine if the requesting trunk was a ringing trunk, a trunk on hold, a trunk on priority hold, if the trunk on hold was giving a message to the operator, or if the trunk on hold was receiving a message from the operator.

If the trunk generating the interrupt is a ringing trunk, the program enters block 266 and causes processor 17B to remove that trunk number from the "lines ringing" list, and generates the necessary cross point addresses to couple the recorded message module 46 (FIG. 2) to the trunk which generated the present interrupt, and causes the recorded message to begin. After the recorded message has been completed the program then causes processor 17B to connect that trunk to the "music on hold" module 44 of FIG. 2. Then, the program enters block 276 and updates all four CRT screen displays.

If, in decision block 264, it is determined that the interrupting trunk is on hold, the program enters block 268, and causes processor 17B to modify the trunk status variable representing the status of that trunk to indicate that the subject trunk is on "critical hold". The program then accordingly updates all CRT screens, as indicated in block 276, so that all four CRT displays indicate that the subject trunk is on critical hold. The program then returns to the interrupt routine of FIG. 4B via label 278.

If the interrupting trunk was already on priority hold, as determined in decision block 264, the program enters block 270 from decision block 264, and assigns the corresponding trunk status variable a "critical priority hold" status, correspondingly updates all four CRT displays, and exits the time delay subroutine via label 278.

If it is determined in decision block 264 that the interrupting trunk is one on which the caller was giving a message to the answering service operator, the program enters block 272, and assigns to the corresponding truck status variable a "critical message being given hold" status, correspondingly updates the CRT displays and exits via label 278. Finally, if the interrupting trunk is one on which a message was being read by the telephone answering service operator to a calling subscriber, the program enters block 274, and assigns to the line status variable a "critical message being taken on hold" status, correspondingly updates the four CRT displays, and returns to the interrupt routine of FIG. 4B via label 278. It is, of course, necessary for the system to remember if a message was being received or given by any line which is placed on hold so that if a different operator subsequently removed the line from hold, she will be alerted as to whether to continue receiving a message or continue giving a message to the caller. In the event that a particular line variable is given "critical priority hold" status, the time delay subroutine of FIG. 4P will cause the corresponding CRT display to be displayed in a "reverse field", wherein the background is light and the characters are dark to alert the operators.

Returning now to the interrupt routine of FIG. 4B, if it is determined in decision block 93 that the interrupting signal INT is a "character interrupt", the program enters block 95, and executes the "process characters" subroutine of FIG. 4C.

Referring to FIG. 4C, the program enters the "execute characters subroutine" via label 100. The program then enters block 102, and "gets" the character from the interrupting device. This means that processor 17B reads the character code outputted from the interrupting keyboard at port 19E (FIG. 2). The fetched character code is assigned to a command variable CMD. An identification number of the operator associated with the interrupting keyboard is assigned to an operator variable OPR.

There are eighteen possible commands, namely those shown on command key pad 261 in FIG. 1B, previously explained. The program enters decision tree 104, which sequentially moves through the decision tree to determine whether the command is the "answer", "place on hold", "display messages", "enter message", "accept all messages", "accept this message", "terminate line", "operator sign in", "operator sign out", "recall specified message from hold", "recall from hold", "reject this message", "answer specified line", "cancel", "go to next message", or "go to previous message" command. The above named commands are "immediate" commands. If the present character is not an immediate command, it is a "message character" and the program enters block 120 and executes a "process message characters" subroutine. For any of the direct commands, the program enters the appropriate subroutine, as indicated in FIGS. 4C and 4CC. After executing the appropriate subroutine, the program returns to the process characters routine of FIG. 4C and returns to the interrupt routine of FIG. 4B via label 122. The program then enables the interrupts, as indicated in block 97. (This allows additional interrupts to be recognized by the system.) The program then returns via label 98 to the idle loop of FIG. 4A.

Referring now to FIG. 4C, if it is determined in decision block 104 that the character interrupt is a ringing trunk, the "answer ring" subroutine 106 of FIG. 4C is entered. The "answer ring" subroutine is shown in FIG. 4D, and is entered via label 106'. The program then enters decision block 126 and determines if a particular operator is free. If the operator is free, the program returns to the process character routine of FIG. 4C via return label 129. If the particular operator is free (available), the program then removes the first "ringing" trunk from the ringing list displayed on the CRT screens. The program also "tags" that particular operator as being busy by assigning a "busy" status to that operator's status variable OPR. The program also effects physical connection of the subject operator to the first ringing trunk by causing processor 17B to output the cross point matrix address required to effect that connection of that operator's operator bus (e.g., operator bus 50A or 50B of FIG. 2) to cross point matrix 34. The program also causes processor 17B to send the appropriate trunk control bus signal via bus 22B (conductor 41B of FIG. 3C) to trunk control circuit 32, closing the appropriate relays of the one of voice coupler circuits 38A to connect the ringing trunk to interface circuit 38, thereby effecting coupling of the ringing trunk to the corresponding receive and transmit conductors of trunk bus 35. The program also causes processor 17B to access the disc unit 16A by means of disc driver 16, fetching subscriber information corresponding to the subject trunk and causing it to be displayed on the CRT screen of the answering operator's console.

The customer information can include the called subscriber's name, a subscriber identification code or password, which must be stated by the caller before the answering service will return a message to the caller, and any other information which will be helpful to the operator in responding to calls to that subscriber. The "answer ring" subroutine then returns via label 129 to the end of block 106 in FIG. 4C.

The "place on hold" subroutine 104A of FIG. 4C is shown in detail in FIG. 4E, and is entered through label 104A'. First, the "place on hold" subroutine enters decision block 132 to determine if the operator is not free, i.e., is answering a trunk call. If the operator is not talking to a caller, the operator obviously cannot place the caller on hold. In this event, the subroutine returns via label 134 to the process character subroutine of FIG. 4C. However, if the operator is not free, then the program enters block 132' to place the trunk to which the operator is connected on hold status. The program then assigns a "free" state to the OPR operator status variable for the console to which the subject operator is assigned. If the operator is taking a message, immediately before the trunk being answered is placed on hold, information must be saved; if the operator is displaying a message, this state of the operator also must be saved. Next, the program places the line that the operator was connected to "on hold" status by causing processor 17B to connect it to music module 44 (FIG. 2) by means of cross point matrix 42. The program then restores the display on the CRT screen to the standard full status display, showing trunk numbers of all ringing trunks and all trunks on hold. The subroutine then returns to the character subroutine of FIG. 4C.

If the character command generating the present interrupt is a "terminate line" command, the terminate line subroutine 114 is entered via label 114' in FIG. 4F. The program then determines in decision block 138 whether the operator is "not free". If the operator is not already connected to one of the trunks, then it is impossible to "terminate", so in this case, the program returns to the end of block 114 in FIG. 4C, thereby preventing processor 17B from trying to execute an invalid "terminate line" command. If the operator is talking to a caller, i.e., is connected to a particular trunk, the terminate subroutine enters block 140, sets the operator status variable OPR as being "free", and physically disconnects the line by appropriately addressing cross point matrix 134 and sending the appropriate disconnect command via trunk control circuit 32 to voice coupler 38A to disconnect the subject trunk from trunk interface circuit 38. The program then effects restoring of the standard full status display on the CRT screen and exits the "terminate line" subroutine via label 142.

If the character is the "enter message" command, then block 108 of FIG. 4C is entered. The "enter message" subroutine is shown in FIG. 4G, and is entered via label 108' of FIG. 4G. In decision block 148, the program determines if the operator is "busy", i.e., talking to a caller, but not doing anything else. If not, the program exits via label 152 and returns to the calling routine. If the operator is busy, the program enters block 150 and assigns to the appropriate operator status variable OPR the status of "taking a message". The program also causes the heading "MSG?" to be displayed on the CRT screen of the appropriate CRT display, e.g., CRT screen 27A. The "enter message" subroutine then is exited via label 152.

If the character causing the interrupt represents the "display message" command, the "display message" subroutine 106 (FIG. 4C), which is shown in FIG. 4I, is entered via label 106A' of FIG. 4I. The program then determines in decision block 174 if the operator is busy. If not, the "display message" subroutine is exited by return label 186. If the operator is busy, the display message subroutine enters block 176.

The "display messages" command will be issued in the event that a subscriber calls and requests that his messages be read by the answering operator. The answering operator then presses the "display message" command key. In block 176, the program effects clearing of the message area on the operator's video monitor screen and marks the operator's status as to being that of "displaying messages". The messages then are fetched from the disc unit and displayed in the message area of the answering operator's CRT screen. The program then enters decision block 178. (When the CRT screen has its message area cleared, then only a few lines of status information will be displayed, as previously explained.) Then all of the messages that have been taken by the answering system for the calling subscriber are displayed on the CRT screen until either there are no more messages left or there is no more display rooom in the message area of the CRT screen. If there are more messages, but there is no more display room on the CRT screen, the program enters decision block 182 and determines whether the message area of the CRT screen is "full" and whether there are additional messages for the calling subscriber yet to be displayed. If this is the case, the program enters block 184 and displays the words "more messages pending" in a reserved location of the answering operator's CRT screen. The program points a cursor at the first displayed message and exits the display message routine via return label 186. If in decision block 178 it is determined that there is more room left on the screen and also that there are additional messages for the calling subscriber yet to be displayed, the program enters block 180 and fills the next location by displaying more of the message. The program then loops back to the beginning of decision block 178 and continues until the decision of decision block 178 is negative.

If the interrupting character represents "accept all messages" command, block 110 of the "character" subroutine of FIG. 4C is entered. This subroutine is shown in the flow chart of FIG. 4H; its purpose is to designate all messages displayed in the message area of the CRT screen as being "accepted" by the calling subscriber. This means that those "accepted" messages have been read by the operator to the subscriber calling in for his messages and that he has accepted them. When the subscriber has indicated that he will take all messages which are displayed on the screen and which have been read to him by the operator, she presses the "accept all messages" command key.

In FIG. 4H, the program enters decision block 156 to determine if the operator is displaying a message. If not, the command is false, and the "accept all messages" subroutine is exited via return label 170. If the operator is displaying messages, the command is valid and the program enters decision block 158 to determine if any messages on the CRT screen are designated "not accepted". If this is the case, the program enters block 160 and "marks" such messages as being accepted and returns to the entry point of decision block 158. The program then enters block 162 and marks the operator status variable OPR as "busy". The program then enters decision block 164. In decision block 164, the program determines if any additional (undisplayed) messages for the calling subscriber are not designated accepted. If there are any messages which have not been accepted, the program enters block 168 and again executes the "display message" subroutine of FIG. 4I and then exits the "accept all" messages subroutine via return label 170. If the decision of decision block 164 is negative, the program exits the "accept all" messages subroutine via return label 170.

In some cases, the caller will not want to accept all messages displayed and read to him by the answering operator. For this situation, the program includes a subroutine which allows the operator to move a cursor which is automatically displayed on the CRT screen adjacent to a particular message. The operator can move the cursor to point at the desired message by means of the above mentioned cursor control keys and then depress the "accept this message" command key to cause that message only to be accepted. To accomplish this, the program enters block 112 of FIG. 4C and executes the "accept this message" subroutine (FIG. 4J), which is entered via label 112' of FIG. 4J. In decision block 192 of FIG. 4J, the program determines if the operator is displaying a message. If not, the "accept this message" subroutine is exited via label 196, since the command is invalid. If the operator is displaying messages, the program enters block 194 and designates the message pointed at by the cursor as being "accepted" and then moves the cursor to point at the next message.

The program then exits the "accept this message" subroutine via return label 196.

If the subscriber does not wish to accept the previously-accepted message pointed out by the cursor, the operator presses the "reject this message" command key causing the program to enter block 328. The "reject this message" subroutine is shown in FIG. 40 and is entered via label 190A of FIG. 40. Then, if the operator is displaying messages, as determined by decision block 192A, the program designates the message pointed to by the cursor as "not accepted" and causes the cursor to point at the next message, as indicated in block 194A. The program then exits the "reject this message" subroutine via return label 196A.

When an operator begins a work shift, she depresses the "sign in" key of the keyboard. The execute character subroutine then enters block 116 of FIG. 4C and executes the "sign in" subroutine which is shown in FIG. 4K and is entered via label 116' of FIG. 4K. The program then enters decision block 200 to determine if the operator has a stored status of being not "signed out". If this decision is affirmative, the program assumes that the operator accidentally pressed the wrong key and intended to press the "sign out" key. The program automatically jumps to the "sign out" subroutine of FIG. 4L in this case. However, if the decision of decision block 200 is that the operator's present status is signed out, the program enters block 204 and marks the operator's status as "signed in", and sets a "time in" variable for the subject operator to the present time of day. The program then also causes an "ID" request to be displayed, in response to which the operator signing in types in her identification number. This has previously been entered and stored on the disc by the manager of the answering service. The program then exits the "sign in" routine via return label 206.

The "sign out" subroutine 118 of FIG. 4C is shown in more detail in FIG. 4L and is entered via label 118' in FIG. 4L. In decision block 210, the program determines if the command variable CMD is set to "sign in" status. (If the operator status for the particular operator's console is "sign in", this means that the previous operator forgot to sign out.) If that is the case, the present time is saved along with the previous operator's name in an "oops" file. In any case, the program then enters block 214 and calculates the number of hours worked by the operator since her signing in time and adds that number to a cumulative total number of hours worked by that operator, saves the new sum and can also compute data which is used for computing the efficiency of that operator, including number of calls answered.

If the key pressed by the operator is not an immediate command key, then the character produced represents either the rest of a direct command or a message character. In this event, the program enters block 120 of FIG. 4CC, which is shown in FIG. 4M, via label 120'. Several of the commands, including operator "sign in", "sign out" "enter message", "answer specified line", "recall specified line", commands include more than one character. For such multiple character commands, the subroutine of FIG. 4M, referred to as the "Message Characters" or "Rest of Command characters" subroutine, must be executed.

In FIG. 4M, the program enters decision block 220 to determine from the stored operator status variable OPR if the operator is taking a message. If she is taking a message, the program enters decision block 222 to determine if the character is a "cancel" character. If the character is a "cancel" character, the program enters decision block 224 and executes a subroutine to effect deleting of the last character entered and then exits from the subroutine via return label 242. If the character is not a "cancel" character, the program enters decision block 226 to determine if the character is an "enter" character, produced by pressing "carriage return" key of the keyboard. If it is, the program enters block 228 and saves the entire message on the disc unit 16, along with the time, date and operator identification. The program then assigns a "busy" state to the appropriate operator variable OPR. The subroutine then is exited via a return label 242.

If the character is not an "enter" character, then the routine enters decision block 230 to determine if the character is printable. If it is, the program enters block 232 and executes a subroutine which appends the character to the message presently being typed in ("Printable" characters include characters A-Z, digits 1-9 and 0, and punctuation such as #, &, etc., but does not include control characters, such line feed, vertical tab, etc.) The program then exits via lebel 242. If it is determined in decision block 220 that the operator is not taking a message, the only alternative left is that the operator is signing in, so the program goes to decision block 234. If the operator is signing in, the character, which must be the sign in code identifying the operator, is appended to the input string, as indicated in block 236. The program then enters decision block 238, tests the character to see if it is an "enter" character; if it is an enter character, the program enters block 240 to verify the identification code entered by the operator. The program then exits the routine of FIG. 4M via return label 242. If in decision block 234 it is determined that the operator is not signing in, the routine exits via return label 242.

FIG. 4N shows the "verify OPR sign in" subroutine referred to in block 240 of FIG. 4M whch is entered via label 240'. The program enters block 246, and searches the disc file for the operator code. If the code is not found in the disc file, as determined by decision block 248, the program enters block 254 and assigns the "sign out" status to the variable OPR and exits via return label 256. If the code is found, the program enters block 250 and saves the time and date, enters block 252 and sets the OPR variable to a "free" status and exits via return label 256.

If the operator has pressed the "answer specified line" key and typed in the specified trunk number, the character subroutine beginning in FIG. 4C enters block 300 in FIG. 4CC. The "answer specified line" subroutine is shown in FIG. 4R and is entered through label 300 of FIG. 4R. The program enters decision block 302 and determines if the operator is free. If the operator is free, the program enters block 304, and sets the operator's status variable OPR to a value which indicates that operator is answering a specified line. The program then displays the prompting message "line number?" (inviting the operator to type in the trunk number of the trunk to be answered) on the CRT display and exits the "answer specified line" subroutine via return label 306. If it is determined in decision block 302 that the operator is not free, the "answer specified line" subroutine is exited via return label 306.

If the operator has pressed the "go to next message" command key, the program enters block 308 of FIG. 4CC. The "go to next message" routine of block 308 is shown in FIG. 4S, and is entered via label 308. The program enters decision block 310 and determines if the operator is presently displaying a message. If not, the "go to next message" subroutine is exited via return label 320. If the operator is displaying a message, the program enters decision block 312 to determine if the cursor previously referred to is pointing at the last message displayed on the screen. If the cursor is not pointing at the last message displayed on the CRT screen, the program enters block 318 and causes the cursor to point at the next message displayed on the CRT screen and exits the "go to next message" subroutine via return label 320. If the cursor is pointing to the last message displayed on the screen, the program enters decision block 314 to determine if there are any more messages for the calling subscriber still stored in memory. If there are none, the program exits the "go to next message" subroutine via return label 320. If there are more messages contained in memory and yet to be displayed on the CRT screen, the program enters block 316. In block 316, the program causes the displayed messages to be physically moved upward toward the top of the CRT screen, eliminating the top message displayed and displaying the next or yet undisplayed message at the bottom of the message display area portion of the screen. The program then exits the "go to next message" subroutine via return label 320.

If the operator has pressed the "go to previous message" command key, the program enters block 322 of FIG. 4CC, and executes the "go to previous message" subroutine, which is shown in detail in FIG. 4T, and is entered via label 322' of FIG. 4T. Then the program enters decision block 324 to determine if the operator is presently displaying messages. If she is not, the "go to previous message" subroutine is exited via return label 338. If the operator is presently displaying messages, the program enters decision block 236 to determine if the top message being displayed on the CRT screen message area is being pointed at by the cursor. If it is not, the program enters block 336, and causes the cursor to point at the subscriber message being displayed above the display message presently being pointed to by the cursor. The program then exits the "go to previous message" subroutine via return label 338. If the message being displayed on the CRT screen message area is being pointed at by the cursor, as determined in decision block 326, the program enters decision block 328 to determine if any messages "ran off" the top of the message display area of the CRT screen. If not, the "go to previous message" subroutine is exited, and if any messages do "run off" the top of the CRT screen, the program enters block 330 and causes all displayed messages to be physically moved down on the message display CRT screen area and causes the previous message to be displayed at the top of the CRT screen message display area. The program then enters decision block 332 and determines if any additional messages still "run off" the top of the CRT message display area. If not, the program enters block 334 and stores the fact that there are no messages which "run off" the top of the CRT screen message display area. The program then exits the "go to previous message" subroutine via return label 338.

If the operator depresses the "recall from hold" command key, the program enters block 340 of FIG. 4CC and executes the "recall from hold" subroutine, which is shown in detail in FIG. 4U, and is entered via label 340' of FIG. 4U. The program then enters decision block 342 in FIG. 4U to determine if the operator is free. If not, the "recall from hold" subroutine is exited via return label 346. If the operator is free, the program enters block 344. A trunk variable "LINE" is assigned to the trunk member of the first ones of the trunk lines on hold to be placed on hold status. The program then causes processor 17B to generate the necessary cross point matrix addresses to disconnect the trunk being recalled from the music on hold module 44 (FIG. 2) and connected to the operator bus (such as 50A of FIG. 2) of the operator recalling the subject trunk from hold. The program then causes processor 17 to correspondingly update all four operator CRT screen displays. The program also restores the operator state that existed immediately before the trunk being recalled from hold was placed on hold. For example, if the operator was taking a message or displaying a message for that trunk immediately before it was placed on hold, that calling status was stored and is now re-assigned to the operator recalling the subject trunk from hold, so that the operator knows how best to continue servicing the caller. The program also displays the operator status newly reassigned to the operator recalling the trunk from hold. The program then exits the "recall from hold" subroutine via return label 346.

If the operator presses the "cancel" command key, the program enters block 348 of FIG. 4CC and executes the "cancel last command" subroutine, which is shown in FIG. 4V, and is entered via label 348' of FIG. 4V. The program then moves to decision block 350 of FIG. 4V to determine what the operator is presently doing. If the operator is presently displaying messages, the program enters block 352 and assigns a busy status to the operator status variable, enters block 364 and restores an appropriate "busy" value to the displayed operator status and exits the "cancel" subroutine via return label 368. If the operator is presently entering a message, the program enters block 364, and exits the "cancel" subroutine via return label 368. If the operator has inadvertently pressed the "sign in" key and wishes to cancel this, the program enters block 356, and assigns to the operator status variable a "sign out" status, appropriately updates the operator display, as indicated in block 364 and exits the cancel subroutine via return label 368. If the operator wishes to cancel a "recall specified line from hold" command, the program enters block 358, and assigns a "free" status value to the operator's status variable OPR, appropriately updates the operator status display, and exits the "cancel" subroutine via return label 368. If the operator wishes to cancel an "answer specified line" command, the program enters block 360, assigns a "free" status value to the operator status variable OPR, appropriately updates the operator display, and exits the cancel subroutine via return label 368. If the operator is doing anything else, the "cancel" subroutine is merely exited via return label 368.

If the operator has depressed the "recall specified line from hold" command key, the program enters block 370 of FIG. 4CC, and executes the "recall specified hold" subroutine, which is shown in FIG. 4W and is entered via label 370'. The program then enters decision block 372 to determine if the operator is free. If she is not, the program exits the "recall specified hold" subroutine via label 376. If the operator is free, the program enters block 374 and assigns to the operator status variable OPR a "recalling line from hold" status, and displays the prompting message "line number?" on the CRT screen display. (This prompts the operator to type the trunk number of the specified line on hold into the answering system by means of the keyboard.) The program then exits the "recall specified hold" subroutine via return label 376.

If the operator has depressed the "reject this message" command key, the program enters block 378 of FIG. 4CC and executes the "reject this message" subroutine, which is shown in FIG. 4X, and is entered via label 378' of FIG. 4X. The program then enters decision block 378 and determines if the operator is presently displaying messages. If not, the "reject this message" subroutine is exited via return label 384. If the operator is displaying messages, the program enters block 380 and designates the message presently pointed at by the previously described cursor as being "not accepted". The program then enters block 382 and automatically moves the cursor to point at the next message and exits the "reject this message" subroutine via return label 384.

If the operator, when displaying messages, wishes to not accept any more messages, she must depress the "exit message mode" key. The resulting interrupt causes the program to enter block 386 of FIG. 4C and execute the "exit message mode" subroutine which is shown in FIG. 4Y and is entered via label 386'. The program then enters block 388, causes processor 17B to save the current accept and reject modes on disc unit 16A and returns the operator's display to normal, and also assigns a "busy" value to the operator status value OPR. The program then exits the "exit message mode" subroutine via return label 390.

While the invention has been described with reference to a particular embodiment, those skilled in the art will be able to make various modifications to the disclosed system and method without departing from the true spirit and scope of the invention.

For example, although coupling of the trunk lines 39 via voice coupler 38A, trunk interface circuit 38, and cross point matrix circuitry 34 at the present time is preferably accomplished by means of analog circuitry, digital coupling is possible if the analog signals are digitally encoded and the digitally encoded signals are subsequently decoded to re-construct the original analog signals. Where wires are utilized to conduct electrical signals which electrically couple various portions of the disclosed circuitry, it is possible that optical coupling via optic fibers or the like could be instead utilized. And, of course, for a different ratio of the number of subscribers to the number of trunk lines or the number of operators to number of trunk lines, the circuitry in FIG. 3A could be easily modified.

We claim:

1. A telephone answering system coupled to a plurality of telephone company trunks, said telephone answering system comprising in combination:
   (a) processor means for executing program instructions;
   (b) memory means responsive to said processor means for storing subscriber messages received from persons placing calls to subscribers of said telephone answering system and subscriber information about said subscribers;
   (c) entry means coupled to said processor means for permitting entry of commands and said subscriber messages into said telephone answering system;
   (d) display means for displaying which trunks are presently ringing, which trunks are presently on hold, subscriber information corresponding to a trunk presently being answered, and subscriber messages taken from callers who have telephoned messages to one of said subscribers;
   (3) means for effecting voice communication between an operator of said telephone answering system and a selected trunk; and
   (f) means responsive to said processor means for selectively effecting electrical coupling of a selected one of said trunks to said voice communication effecting means, wherein said coupling means includes voice coupling means responsive to said processor means for transmitting a status signal representing a condition occurring on a first one of said trunks to said processor means to cause said voice coupling means to effect electrical coupling of said first trunk to a first transmit conductor and a first receive conductor.

2. The telephone answering system of claim 1 wherein said entry means permits manual entry of said commands and said subscriber messages, and wherein said subscriber messages are in alphanumeric form.

3. The telephone answering system of claim 2 wherein said entry means includes an alphanumeric keyboard and a command key pad.

4. The telephone answering system of claim 3 wherein said display means includes a CRT screen.

5. The telephone answering system of claim 4 wherein said voice communication effecting means includes a plurality of operator headsets having a speaker means and a microphone.

6. The telephone answering system of claim 5 including tone decoding means coupled to said coupling means for decoding a sequence of tones identifying said first trunk to produce a digital code representing the identity of said first trunk, and transmitting said code to said processor means.

7. The telephone answering system of claim 6 wherein said coupling means includes switching means responsive to said processor means for selectively coupling said first transmit conductor and said first receive conductor to a first one of said operator headsets.

8. The telephone answering system of claim 6 including means responsive to outputs of said voice coupling means for producing a transmit signal on said first transmit conductor in response to a transmit signal conducted on said first trunk and producing a receive signal on said first receive conductor in response to a receive signal transmitted on said first trunk.

9. The telephone answering system of claim 7 including means responsive to said voice coupling means and said entry means for determining and storing the present status of each of said trunks and each operator operating a keyboard and utilizing a headset of said telephone answering system.

10. The telephone answering system of claim 9 wherein said processor means utilizes said code and said stored statuses to effect producing of an address number to cause said switching means to accomplish said selective coupling.

11. The telephone answering system of claim 10 wherein said entry means and said display means together include a plurality of operator consoles each including a keyboard and a video display element, each of said video display elements effecting display of subscriber information corresponding to separate trunks presently being answered, respectively, each of said video display elements also effecting display of subscriber messages taken from respective callers who have telephoned messages to different ones of said subscribers in response to actuating of an answer key of the keyboard of the operator console which includes that video display element while one of said trunks is presently ringing.

12. The telephone answering system of claim 10 wherein said memory means includes a disc unit coupled to said processor means for storing said subscriber messages and said subscriber information.

13. The telephone answering system of claim 10 wherein said processor means includes means responsive to said entry means for effecting displaying of a subscriber message in alphanumeric form being typed into said keyboard from a caller to that subscriber by an operator and effecting storing of that subscriber message in said memory means.

14. The telephone answering system of claim 13 wherein each of said video display elements includes a CRT screen including means responsive to said entry means for effecting automatic fetching of a subscriber message for a calling subscriber presently being answered from said memory means and effecting display of that subscriber message on one of the CRT screens to allow an operator to easily reach the displayed subscriber message to the calling subscriber.

15. The telephone answering system of claim 14 including means for designating displayed subscriber messages as accepted by a calling subscriber and displaying the acceptance designation adjacent to the accepted subscriber message on one of said CRT screens.

16. The telephone answering system of claim 14 including means for displaying a cursor on said display screen adjacent to a displayed subscriber message and means included in said keyboard for allowing an operator to move said cursor to a location adjacent to another displayed subscriber message.

17. A method of using a telephone answering system coupled to a plurality of telephone company trunks, the telephone answering system including:
  i. processor means for executing program instructions,
  ii. memory means responsive to said processor means for storing information,
  iii. means coupled to said processor means for effecting entry of information into said telephone answering system,
  iv. display means for displaying information in response to the processor means,
  v. means for effecting voice communication between an operator of said telephone answering system and a selected trunk, and
  vi. means responsive to said processor means for selectively effecting electrical coupling of a selected one of said trunks to said voice communication effecting means, said method comprising the steps of:
  (a) sending ring interrupt information to the processor means in response to ringing of one of the trunks,
  (b) utilizing the processor means to transmit a first coupling signal to the coupling means to effect electrical coupling of said ringing trunk to the voice communication effecting means;
  (c) decoding a sequence of tones conducted by said ringing trunk to identify a first subscriber to whom the call on said ringing trunk is being made in order to produce a first digital code representing the identity of said ringing trunk and transmitting said first digital code to the processor means;
  (d) utilizing said first digital code and the processor means to produce a first address code and transmitting said first address code to the coupling means to further effect electrical coupling of said ringing trunk to the voice communication effecting means; and
  (e) utilizing the entry means to enter a first subscriber message from a first caller on said ringing trunk into the telephone answering system in alphanumeric form and utilizing the processor means to effect storing of said first subscriber message in the memory means.

18. The method of claim 17 wherein said entering of said first subscriber message is a manual entering, and wherein said first subscriber message is spoken by said first caller, and wherein said first subscriber message is entered in alphanumeric form.

19. The method of claim 18 including the step of initially storing subscriber information about subscribers to the telephone answering system in the memory means, before step (a), said method further including the steps of operating on said first digital code by the processor means to effect fetching of first subscriber information for said first subscriber from the memory means and displaying of said first subscriber information on the display means.

20. The method of claim 19 wherein an operator of the telephone answering system reads said displayed first subscriber information to aid in answering the call on said ringing trunk.

21. The method of claim 17 including utilizing said first digital code and the processor means to subsequently effect fetching said first subscriber message from the memory means in response to a call received from said first subscriber and utilizing the processor means and the display means to effect displaying of said first subscriber message.

22. The method of claim 21 wherein an operator reads said displayed first subscriber message to said first subscriber.

23. The method of claim 22 including the step of utilizing the processor means and the entry means to effect designating said first subscriber message as being accepted by said first subscriber and storing said designation in the memory means.

24. The method of claim 23 including the step of utilizing the entry means and the processor means to effect placing of said ringing trunk on hold status.

25. The method of claim 24 including the step of utilizing the processor means to effect repeatedly determining and storing of information representing the status of each of the trunks and each operator operating the telephone answering system, said status information being utilized in producing said first address code.

* * * * *